(12) United States Patent
Benisty

(10) Patent No.: US 11,669,267 B2
(45) Date of Patent: Jun. 6, 2023

(54) COMPLETION ENTRY THROTTLING USING HOST MEMORY

(71) Applicant: Western Digital Technologies, Inc., San Jose, CA (US)

(72) Inventor: Shay Benisty, Beer Shiva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/915,981

(22) Filed: Jun. 29, 2020

(65) Prior Publication Data
US 2020/0333975 A1  Oct. 22, 2020

Related U.S. Application Data

(63) Continuation-in-part of application No. 15/893,430, filed on Feb. 9, 2018, now Pat. No. 10,884,658.

(51) Int. Cl.
*G06F 3/06* (2006.01)

(52) U.S. Cl.
CPC .......... *G06F 3/0656* (2013.01); *G06F 3/0604* (2013.01); *G06F 3/0653* (2013.01); *G06F 3/0659* (2013.01); *G06F 3/0679* (2013.01)

(58) Field of Classification Search
CPC .... G06F 3/0656; G06F 3/0604; G06F 3/0653; G06F 3/0659; G06F 3/0679; G06F 2212/1024; G06F 12/0246; G06F 3/061; G06F 13/00; G06F 3/0635; G06F 3/0655; G06F 3/0671; G06F 13/14; G06F 13/161; G06F 13/1626; G06F 13/1642; G06F 13/20; G06F 11/14; G06F 27/002; G06F 23/042;

(Continued)

(56) References Cited

U.S. PATENT DOCUMENTS 9,417,814 B1 * 8/2016 Hall ................. G06F 3/0604
9,690,714 B1   6/2017 Sites
(Continued)

OTHER PUBLICATIONS

NVP Express: Base Specification, Revision 1.4; Jun. 10, 2019; https://nvmexpress.org/wp-content/uploads/NVM-Express-1_4-2019. 06.10-Ratified.pdf; 403 pages.*

(Continued)

*Primary Examiner* — Sanjiv Shah
*Assistant Examiner* — Elias Young Kim
(74) *Attorney, Agent, or Firm* — Loza & Loza, LLP; Gabriel Fitch

(57) ABSTRACT

Technologies and techniques for use by a data storage controller or similar device for throttling the delivery of completion entries pertaining to the execution of commands by a nonvolatile memory (NVM) device are provided. In an illustrative example, the data storage controller selectively throttles the delivery of completion entries to a host device using uniform delivery intervals to provide for stable delivery of completion entries to the host. In some examples, the throttling is achieved by storing new completion entries in a completion queue of the host while initially setting corresponding indicator bits within the completion entries (e.g. phase tags) to cause the host to ignore the new completion entries as though the new entries were old entries. Later, after a throttling delay interval, the indicator bits are inverted to allow the host to recognize and process the new completion entries. NVMe examples are provided.

25 Claims, 23 Drawing Sheets

(58) Field of Classification Search
CPC ............... G06F 15/685; G06F 2220/41; G06F 2220/655; G06F 2220/93; G06F 21/00; G06F 12/00; G06F 2206/10; G06F 2212/00; G11C 16/06
USPC .......................................................... 711/103
See application file for complete search history.

(56) References Cited

U.S. PATENT DOCUMENTS

| | | | |
|---|---|---|---|
| 9,733,980 | B1 | 8/2017 | Khan et al. |
| 10,387,078 | B1 | 8/2019 | Benisty |
| 10,901,942 | B2* | 1/2021 | Dain ................... G06F 16/1748 |
| 2007/0255892 | A1 | 11/2007 | Jachalsky et al. |
| 2007/0283121 | A1* | 12/2007 | Irish .................... G06F 12/1027 711/202 |
| 2009/0196102 | A1 | 8/2009 | Kim |
| 2009/0249356 | A1* | 10/2009 | He .......................... G06F 9/546 719/314 |
| 2013/0054871 | A1 | 2/2013 | Lassa |
| 2013/0097655 | A1* | 4/2013 | Vaidyanathan ......... G06F 21/55 726/1 |
| 2013/0265825 | A1 | 10/2013 | Lassa |
| 2016/0246726 | A1 | 8/2016 | Hahn |
| 2016/0342545 | A1 | 11/2016 | Arai et al. |
| 2017/0075834 | A1* | 3/2017 | Cha ........................ G06F 3/0655 |
| 2017/0083252 | A1* | 3/2017 | Singh .................... G06F 3/0604 |
| 2017/0123656 | A1 | 5/2017 | Benisty et al. |
| 2018/0227237 | A1 | 8/2018 | Buban |
| 2018/0337867 | A1 | 11/2018 | Davies et al. |
| 2019/0227744 | A1* | 7/2019 | Olarig ................... G06F 3/0619 |
| 2019/0354310 | A1* | 11/2019 | Tsirkin ................. G06F 12/0802 |

OTHER PUBLICATIONS

NVP Express: Base Specification, Revision 1.4; Jun. 10, 2019; https://nvmexpress.org/wp-content/uploads/NVM-Express-1_4-2019. 06.10-Ratified.pdf; 403 pages. (Year: 2019).*
NVM Express, Revision 1.0e; Jan. 23, 2013; 127 pages.
NVM Express, Revision 1.3a; Oct. 24, 2017; 287 pages.

* cited by examiner

COMPLETION ENTRY THROTTLING USING HOST MEMORY

CROSS-REFERENCE TO RELATED APPLICATIONS

This application is a Continuation-in-Part of U.S. patent application Ser. No. 15/893,430, filed Feb. 9, 2018, entitled "COMPLETION ENTRY THROTTLING USING DATA STORAGE CONTROLLER," the entire content of which is incorporated herein by reference.

FIELD

The subject matter described herein relates to data storage controllers. More particularly, the subject matter relates, in some examples, to throttling the host processing of completion entries for nonvolatile memory (NVM) storage operations.

INTRODUCTION

The nonvolatile memory express (NVMe) system is a scalable host controller interface designed to address the needs of enterprise and client systems that utilize Peripheral Component Interconnect (PCI) Express-based solid state drives. See, for example, the NVM Express standard, Revision 1.3a, Oct. 24, 2017. With NVMe, a host device writes data storage device commands, such as read commands, write commands, and administrative commands, in submission queues that are implemented in host memory. The controller of a NVM storage device such as a NAND fetches the commands from the host submission queues, executes the commands, and posts entries in completion queues, which are also implemented in host memory, to thereby notify the host device of the completion of the commands. For example, completions may be generated by the NVM device controller upon determining that the data transfer for a specific command has been completed. For example, for a 16 kilobyte (KB) read command, the device controller may transfer NAND read data to the host, and when the device controller detects that the entire transfer has completed, a completion message is generated by the NVM device controller and posted to the host. The completion entries may include error messages to indicate if a command was unsuccessful. In this manner, NVMe exploits a paired submission and completion queue mechanism where commands are initially placed by host software into a submission queue and then the completions or error messages are placed by the NVM device controller into the associated completion queue. The completion queue may be, for example, a circular buffer with a 16 Byte fixed slot size used to post the status of completed commands as "completion entries."

In practice, completion entries may be generated by the NVM device controller at time intervals subject to considerable variation, resulting in relatively unstable performance by the NVM device controller. The timing interval variations may be due to factors such as variations in NAND die usage, the behavior of Read Look Ahead procedures, or other factors. Ordinarily, the NVM device controller forwards the completion entries to the host device using the same order and timing with which the completion entries are generated by the NVM device controller. The host device may thus receive the completion entries from the NVM device controller at more or less random times, which can be inconvenient for the host processor, particularly if the host processor needs to respond to an interrupt whenever a new completion entry is received. Moreover, with this arrangement, the host processor might need to respond to routine read or write command completion acknowledgements before receiving relatively more important error messages.

It would be desirable to provide systems and methods for delivering completion entries from a data storage device to a host device under the control of a data storage controller in a more intelligent and uniform manner and/or for throttling host processing of completion entries while reducing storage burdens within the data storage controller.

SUMMARY

One embodiment of the present disclosure provides a data storage controller for use with a data storage device and a host device. The data storage controller includes a processing system configured to: receive a command from the host device; generate a value indicative of completion of the command by the data storage device for reporting to the host device; store the value in a queue of the host device along with an indicator that indicates to the host device that the host device has already processed the value, even though the host device has not yet processed the value; and modify the indicator to indicate to the host device that the value has not yet been processed and thereby cause the host device to process the value.

Another embodiment of the present disclosure provides a method for use by a data storage controller. The method includes: receiving a command from the host device; generating a value indicative of completion of the command by the data storage device for reporting to a host device; storing the value in a queue of the host device along with an indicator that indicates to the host device that the host device has already processed the value, even though the host device has not yet processed the value; and resetting the indicator to indicate to the host device that the value has not yet been processed to thereby cause the host device to then process the value.

Yet another embodiment of the present disclosure provides an apparatus for use with a data storage device. The apparatus includes: means for receive a command from the host device; means for generating a value indicative of completion of the command by the data storage device for reporting to a host device; means for storing the value in a queue in a memory of the host device along with an indicator set to indicate to the host device that the host device has already processed the value, even though the host device has not yet processed the value; and means for modifying the indicator to the host device that the value has not yet been processed and thereby cause the host device to process the value.

BRIEF DESCRIPTION OF THE DRAWINGS

The subject matter described herein will now be explained with reference to the accompanying drawings of which.

DETAILED DESCRIPTION

Figure 1:
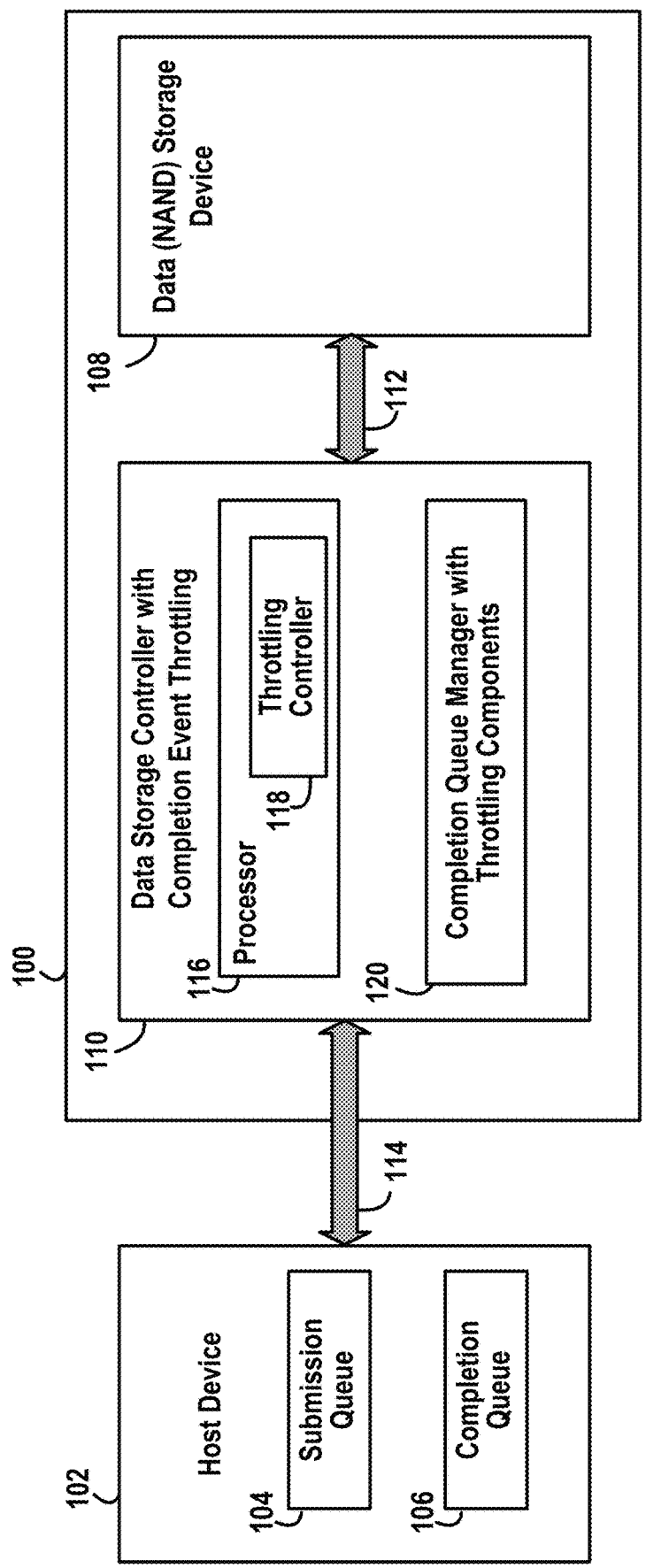
FIG. 1 illustrates a data storage system having a data storage controller and a data storage device (such as a NAND), where the data storage controller is equipped to selectively throttle the delivery of completion entry values to a host device.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to data storage devices (DSDs) and to data storage controllers of the DSDs. In the main examples described herein, data is stored within non-volatile memory (NVM) arrays. In other examples, data may be stored in hard disk drives (HDD). DSDs with NVM arrays may be referred to as solid state devices (SSDs). Some SSDs use NAND flash memory, herein "NANDs." A NAND is a type of non-volatile storage technology that does not require power to retain data. It exploits negative-AND, i.e. NAND, logic. For the sake of brevity, an SSD having one or more NAND dies will be used as a non-limiting example of a DSD below in the description of various embodiments. It is understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays.

Overview

Aspects of the present disclosure provide various apparatus, devices, systems and methods for stabilizing the performance of a data storage device. Examples described herein relate to nonvolatile memory (NVM) storage systems configured for use with the nonvolatile memory express (NVMe) system. See, again, the NVM Express standard, Revision 1.3a, Oct. 24, 2017. However, aspects of the techniques described herein are applicable to other data storage systems or protocols. Briefly, in some examples, the data storage controller of an NVM device, such as a NAND, selectively and intelligently throttles the delivery of completion entries to a host processor to provide for the more uniform and stable delivery of the completion entries to the host processor. In some examples, rather than immediately forwarding completion entries to the host processor in the same order and using the same relative timing with which the completion entries are generated by the data storage controller, the data storage controller instead selectively delays the reporting of some completion entries relative to other completion entries so the entries may be delivered with uniform time delays. In this manner, the aforementioned instabilities in delivery performance of a data storage device may be smoothed out or eliminated to provide more stable performance.

Throttling may enable the host processor to more efficiently process the completion entries. In this regard, rather than requiring the host processor to respond (via an interrupt) to completion entries that might be posted at random times relative to one another, the host processor can instead respond to a sequence of completion entries that are uniformly spaced in time, i.e. the completion entries have uniform time delays between one entry and the next, such as one entry delivered to the host processor every five microseconds. In this manner, the host can better predict and respond to the behavior of the data controller, improving efficiency. Moreover, although the delivery times of some completion entries are delayed relative to others, the overall completion rate is not necessarily reduced and, indeed, may be improved since the host can more reliably predict and respond to the delivery of completion entries. For example, without the uniform and predictable delivery of completion entries using throttling, the host may sometimes need to temporarily stop the data storage device from delivering data, thus hindering the overall completion rate. (Generally speaking, performance is measured by command completion rate. The higher command completion rate, the better the performance.)

Still further, in some examples, high priority completion entries, such as those pertaining to error messages, are forwarded promptly to the host processor (i.e. without any imposed throttling delay) so that the host processor may be quickly notified. In some specific examples described herein, the data storage controller distinguishes between "simplified" completion entries, which are normal read/write command entries, and "full" completion entries, which may include error messages or the like. The simplified completion entries, which are by far the most common completion entries in a typical NVMe system, are throttled to provide for stable and uniform time delivery. The full completion entries, which are typically far less common, are not throttled and are instead reported promptly to the host processor.

Thus, the data storage controller may be programmed to hold simplified completion entries internally rather than posting them immediately to the host, whereas the full completion entries are posted immediately. The full completion entries hold more data and hence consume more internal memory than the simplified entries. By immediately posting the full completion entries, internal memory (area) resources of the data storage controller are not unduly burdened. The simplified completion entries do not hold much information since most fields are cleared, and hence do not consume much internal memory. Moreover, there may be no significant advantage to throttling full entries since the processing of full entries is considered a non-performance path. In any case, the hardware (HW) of the data storage controller may auto-generate the completion messages. The messages corresponding to simplified completion entries may be aggregated internally while posting them to the host at a configurable throttling rate, whereas the full entries are posted without any imposed delays. During an initialization or setup phase, the firmware (FW) of the data storage controller may enable the throttling feature and, if so, the completion rate (i.e. the throttling rate) may be configured as well.

FIG. 1 illustrates, at a high level, a data storage system 100 configured to selectively throttle the posting of completion entries to a host device 102 equipped with a submission queue 104 and a completion queue 106. For a write operation, the data storage system 100 receives data from the host device 102 (via the submission queue 104) and stores the data in a data storage device 108, such as a NAND, under the control of a data storage controller 110 (which may also be referred to as a memory controller). Data and commands may be routed between the data storage controller 110 and the data storage device 108 along an internal bus 112. Data and commands may be routed between the host device 102 and the data storage controller 110 along an external bus 114. The data storage device 108 supplies information to the data storage controller 110 indicating successful completion of the storage of the data or indicating error or anomaly conditions. The data storage controller 110 generates completion entries to indicate successful completion of a particular data transfer command or to indicate errors or anomalies. That is, completion entries are generated by data storage controller 110 upon determining that the data transfer for a specific command has been completed. By way of example, for a particular read command, the data storage controller 110 may transfer read data to the host 102 and when the device controller 110 detects that the entire transfer has completed, a completion entry is generated by the device controller 110 and posted to the host via the completion queue 106.

In the implementation example of FIG. 1, data storage controller 110 includes a processor 116 with a throttling controller 118. The data storage controller 110 also includes a completion queue manager 120 that manages the posting of the completion entries to the completion queue 106 of the host device while selectively throttling delivery of the completion entries to the completion queue 106 in a stable and uniform manner. That is, completion queue manager 120, under the control of the throttling controller 118, intelligently throttles the delivery of completion entries to the completion queue 106 of the host device 102 to provide for the more uniform and stable delivery of the completion entries.

The throttling controller 118 may initially set the throttling rate of the completion queue manager 120 based on the link speed of the system (i.e. based on the transfer rate of bus 114) or other factors. The throttling rate relates to the time interval between the posting of consecutive simplified completion entries to the completion queue of the host. In some examples, the throttling rate is set to post one new simplified completion entry to the completion queue every 5 microseconds. That is, the throttling rate is "1 simplified completion entry per 5 microseconds." In another example, the throttling rate might be "1 simplified completion entry per 4 microseconds." And so when the throttling rate is higher, the interval between completion entries is reduced and more completion entries are posted per second (which tends to reduce the average number of entries in the completion queue). When the throttling rate is lower, the interval between entries is increased and fewer completion entries are posted per second (which tends to increase the average number of entries in the completion queue). The foregoing throttling rate numeric examples are just some illustrative examples and the throttling rate for any particular practical system may be based set on the particular needs of the system, such as the link speed and the page size (and/or link width). The throttling controller 118 may also selectively change the throttling rate to, for example, prevent the completion queue 106 from becoming too full (based on a programmable threshold value).

In examples where the system is configured to distinguish between full and simplified completion entries, the processor 116 controls the posting of the completion entries so that any full completion entries are posted to the completion queue 106 of the host device 102 without any throttling delay, whereas the simplified completion entries are routed to the completion queue 106 using the completion queue manager 120 for uniform delivery in accordance with the current throttling rate.

Note that FIG. 1 illustrates only selected features of an exemplary system. A more complete system configured in accordance with NVMe is described below. Moreover, the discussion of FIG. 1 has used the storage of data to the data storage device 108 (i.e. a write operation) as an illustrative example. The system is also equipped to retrieve data (i.e. perform read operations) from the data storage device 108 and to perform other related functions. A wide variety of completion entries may thus be generated and processed by the system.

Figure 2:
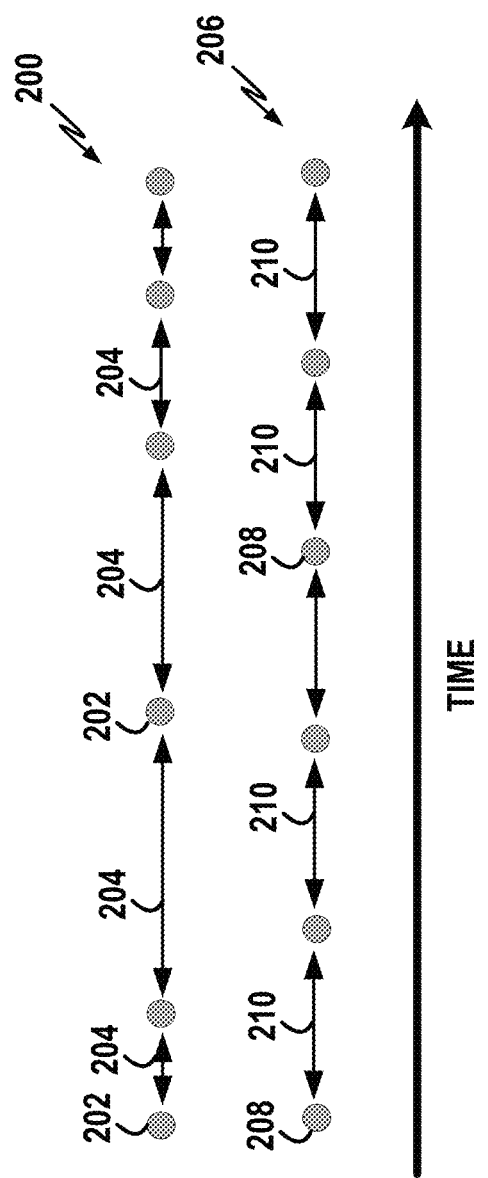
FIG. 2 graphically illustrates the selective throttling of the delivery of completion entry values to a host device by a data storage controller.

FIG. 2 illustrates the effect of the throttling of exemplary completion entries. A first graph 200 illustrates the relatively non-uniform (e.g. random) posting of individual completion entries 202, which are posted subject to varying time delays 204 therebetween. A second graph 206 illustrates the more uniform (e.g. fixed) posting of individual completion entries 208, which are posted subject to a uniform (fixed) time delay 210 therebetween. Note that the average completion rate is the same in both cases. That is, selectively delaying delivery of some completion entries relative to others to achieve a fixed rate does not reduce the average completion rate. Indeed, as already discussed, by allowing the host processor to more reliably predict the delivery times of completion entries based on a fixed rate, the overall completion rate (i.e. overall performance) may be improved as compared to relatively instable delivery.

Figure 3:
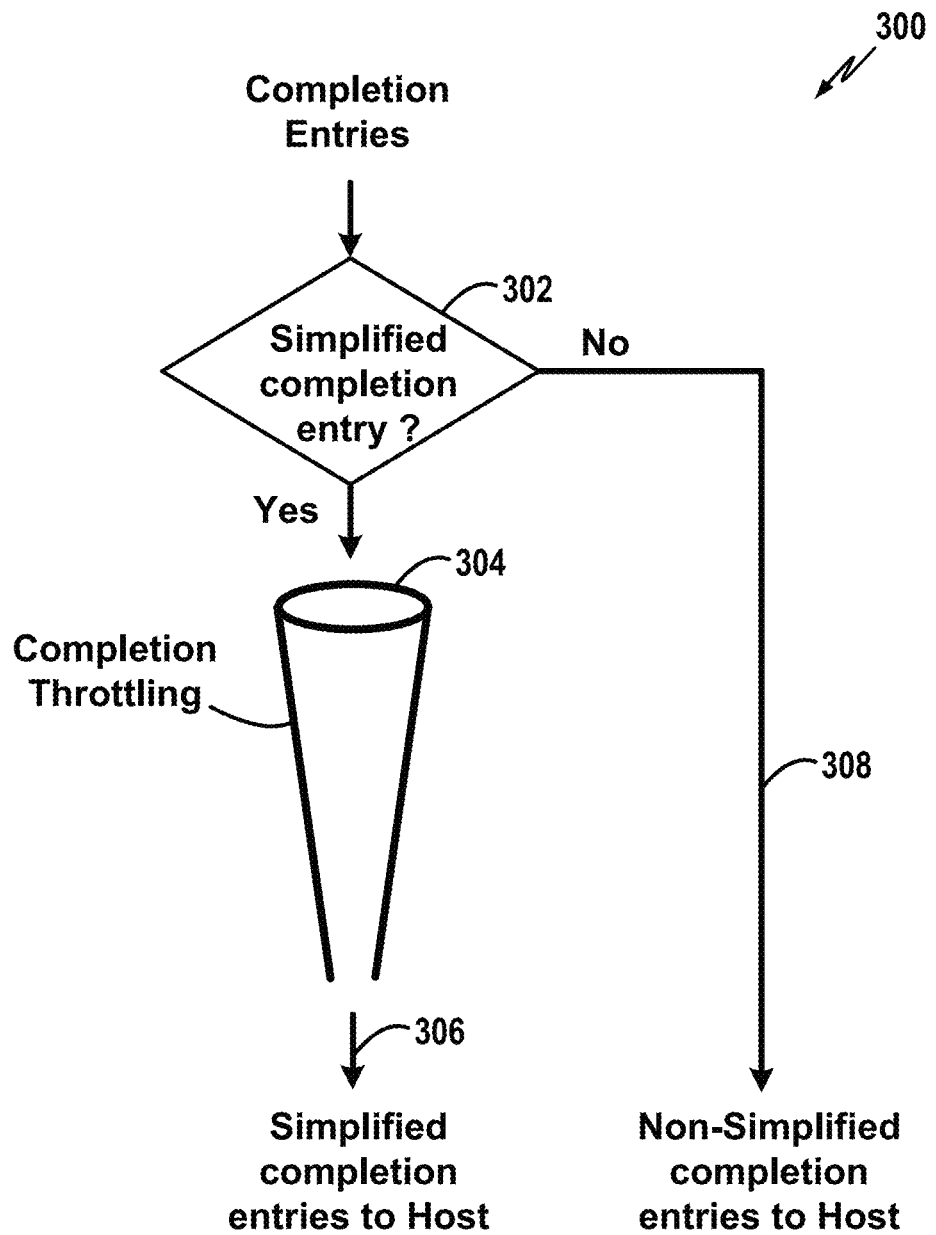
FIG. 3 is a high-level flow chart further illustrating the selective throttling of the delivery of completion entry values to a host device by a data storage controller.

FIG. 3 schematically summarizes the throttling of exemplary completion entries for an implementation 300 where simplified completion entries are throttled but full completion entries are not. Briefly, each new completion request is assessed at 302 to determine if it provides a simplified completion entry or a full completion entry. Simplified completion entries are throttled at 304 so that they can be posted at a uniform rate along line 306 to a host device (not shown in FIG. 3). The narrowing shape of throttle 304 is intended to illustrate the use of a uniform throttled posting rate (as with graph 206 of FIG. 2). In contrast, full completion entries are not throttled and are instead output along a line 308 to the host device to permit prompt processing by the host device of the full completion entries.

The features described herein may be used in conjunction with features described in U.S. patent application Ser. No. 14/929,317, filed Oct. 31, 2015, of Benisty et al., entitled "METHODS, SYSTEMS, AND COMPUTER READABLE MEDIA FOR AGGREGATING COMPLETION ENTRIES IN A NONVOLATILE STORAGE DEVICE," which is fully incorporated by reference herein. In one example, completion entries are aggregated as described in Ser. No. 14/929,317, but then posted to the host at a fixed (throttled) rate while each posting may hold one or more completion entries.

In the following section, various NVMe-based throttling examples are described.

Exemplary NVMe Embodiments

According to the NVMe standard, a host device communicates memory device commands, such as read commands, write commands, and administrative ("admin") commands, to a nonvolatile storage device using submission queues. The non-volatile storage device further executes the commands and subsequently places and/or posts corresponding entries in completion queues, which are also implemented in host memory, to notify the host device of completion of the commands. Notably, the transfer of completion entries on a PCIe bus existing between a host device and its associated nonvolatile memory device can be improved in NVMe systems by selectively throttling the posting of the completion entries.

Figure 4:
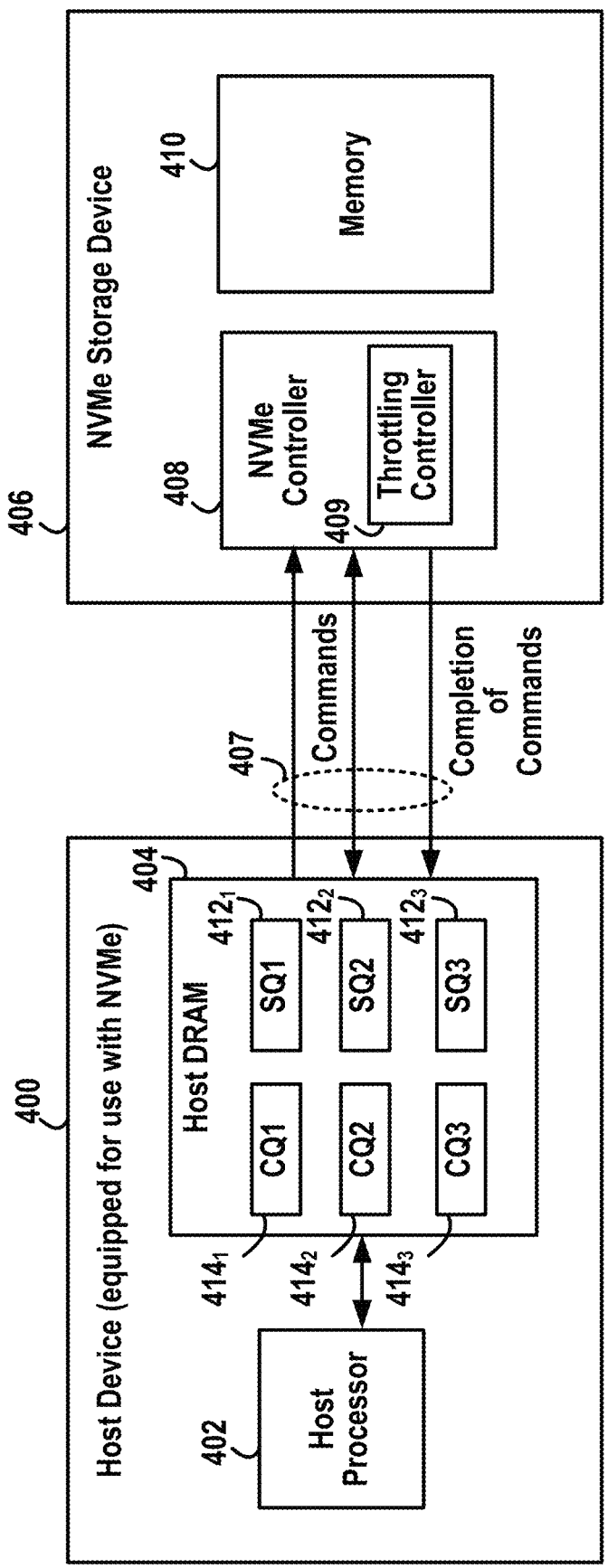
FIG. 4 illustrates a data storage system equipped for use with NVMe where the data storage controller selectively throttles the delivery of completion entry values to a host device.

FIG. 4 illustrates certain features of an exemplary NVMe architecture in which the completion throttling may be implemented. In FIG. 4, a host device 400 may be any suitable computing platform capable of accessing memory on a storage device using NVMe procedures. For example, host device 400 may be a desktop personal computer, a laptop computer, a tablet computer, a mobile telephone, or a front end to a storage array. The host device 400 includes a processor 402 and an internal memory 404, which in this example is dynamic random access memory (DRAM). The host device 400 may store data in an NVMe storage device 406. The NVMe device 406 may be any suitable device that provides nonvolatile memory storage for host device 400 in accordance with NVMe standards. For example, the NVMe device 406 may be a removable storage device, such as a solid state drive (SSD) that is removably connectable to host device 400. In another example, the NVMe device 406 may be non-removable or integrated within the host device 400. In some embodiments, the host device 400 and the NVMe device 406 are communicatively connected via a PCIe bus (represented via the set of arrows 407).

The NVMe storage device 406 of FIG. 4 includes an NVMe controller 408 and a nonvolatile memory 410. The NVMe controller 408 controls access to the nonvolatile memory 410 such as a NAND. The NVMe controller 408 thus may be a nonvolatile memory controller that implements or supports the NVMe protocol, and nonvolatile memory 410 may be 2D or 3D NAND flash memory. The NVMe controller includes a throttling controller 409, which controls the throttling of completion entries, as already discussed. For the host device 400 to read data from or write data to the NVMe storage device 406, the host processor 402 creates and writes commands in submission queues SQ1 $412_1$, SQ2 $412_2$, and SQ3 $412_3$. Three submission queues are shown for illustrative purposes. There may be more or fewer than three submission queues at any given time depending on NVMe device usage by the host system. The NVMe controller 408 fetches the commands from the submission queues $412_1$, $412_2$, and $412_3$ and executes the commands. Upon completion of the commands, the NVMe controller 408 writes completion entries that are ultimately directed to completion queues CQ1 $414_1$, CQ2 $414_2$, and CQ3 $414_3$ and throttles the delivery of those completion entries.

In some examples, each of the completion queues $414_1$, $414_2$, and $414_3$ is a circular buffer memory with a fixed 16 byte slot size that is configured to post completion entries (e.g., entries that indicate status of completed commands). In some embodiments, during an initialization phase, the host device 400 may create the set of submission queues (e.g., the queues $412_1$, $412_2$, and $412_3$) and the corresponding set of completion queues (e.g., the queues $414_1$, $414_2$, and $414_3$). The host device 400 may further generate and hold a sequential queue-completion queue mapping table (not shown) that records the associations/mappings via the use of sequential queue identifiers and completion queue identifiers.

Figure 5:
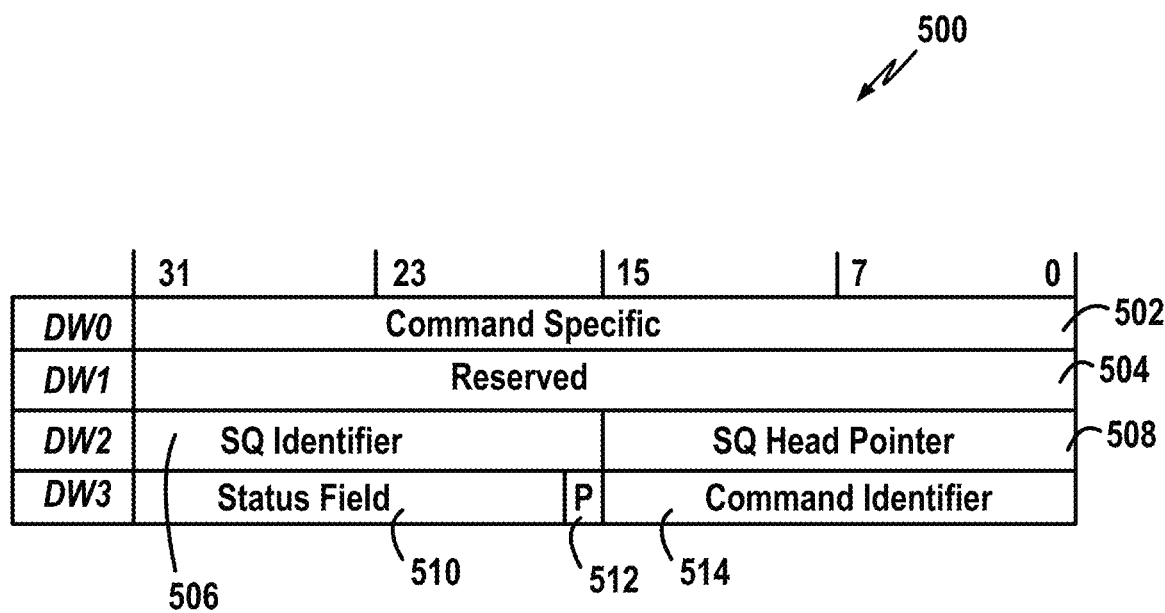
FIG. 5 illustrates an exemplary NVMe completion entry for processing by the NVMe system of FIG. 4

FIG. 5 illustrates an exemplary structure of a completion entry 500 for a particular command issued to the NVMe storage device of FIG. 4. The completion entry 500 contains data for writing (or posting) a completed command to a designated completion queue (CQ) on the host device (such as one of the completion queues of FIG. 4). As shown in FIG. 5, completion entry 500 includes a set of data fields including a command specific field 502, a reserved field 504, a submission queue (SQ) identifier field 506, a SQ head pointer field 508, a status field 510, a 'P' field phase tag or bit 512, and a command identifier field 514. The fields are configured to contain data values based on the type of command associated with completion entry 500. For example, for simplified non-admin commands, a command specific field 502 and a Status field 510 of completion entry 500 are cleared to a zero value (unless an error occurs). For example, command specific field 502 contains zeroes if the associated command is an operational I/O command, such as a read command or a write command. In contrast, if the command is an admin command (or an error), command specific field 502 contains non-zero information in accordance with the admin command (or additional information indicative of the error) and hence is regarded as a full entry.

Using the completion entry structure of FIG. 5, a data storage controller may thus easily distinguish between simplified entries and full entries. Simplified entries are entries in which the Command Specific field 502, the Reserved field 504 and the Status field 510 are all cleared (i.e. all set to zero values). Full entries are entries in which the Command Specific field 502, the Reserved field 504 and/or the Status Field 510 are not equal to 0. That is, the Command Specific field 502, the Reserved field 504 and the Status Field 510 are cleared for successful read/write command completions. For other commands and error scenarios, the Command Specific field 502, the Reserved field 504 and the Status Field 510 are not cleared.

Figure 6:
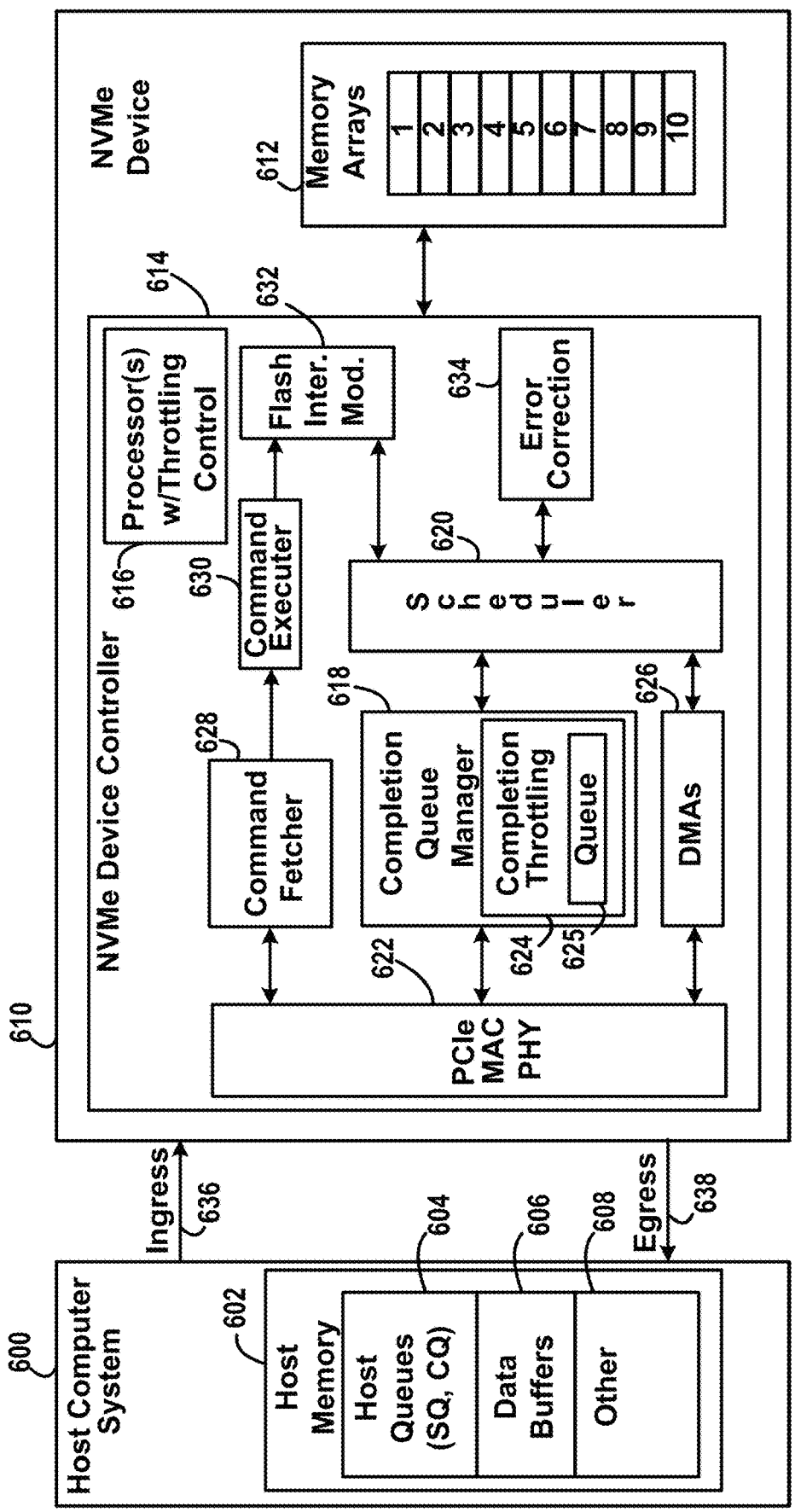
FIG. 6 further illustrates the exemplary NVMe data storage system of FIG. 4.

FIG. 6 illustrates further details of an exemplary NVMe system. In FIG. 6, a host computer system 600 includes host memory 602, which includes host queues 604 (such as the aforementioned SQ and CQ queues), data buffers 606, and other memory components 608. An NVMe device 610 includes memory arrays 612 and an NVMe device controller 614. The NVMe controller 614 includes one or more processors 616, one of which may be equipped to control throttling by, e.g., setting an initial throttling rate and then adjusting the rate, as appropriate. The processors are also responsible for the execution of Frond-End and Back-End tasks. A completion queue manager 618 is responsible for managing the host completion queues. Among other functions, the completion queue manager 618 routes completion entries received from a scheduler 620 to a completion queue within the host device 600 via a PCIe MAC PHY interface 622 while throttling the delivery of the completion entries using a completion throttling component 624, which includes an internal queue 625. Note that the internal queue is not necessarily a first in/first out (FIFO) queue since entries might not be pulled from the queue in the same order in which they are pushed initially into the queue.

In an illustrative example, simplified completion entries are pushed into the internal queue 625 by the completion queue manager 618 in the order received from the scheduler 620. The completion throttling component 624 then pulls completion entries from the internal queue to post the entries to a completion queue 604 of the host 600 in accordance with the current throttling rate. (At each posting, one or more messages may be posted to the host.) In some examples, if the number of entries in the internal queue 625 exceeds a programmable threshold value (which may be set of, for example, in the range of 3-10 and, in one particular example, is set to 5), the processor 616 increases the throttling rate (to thereby reduce the interval between completion postings). In some examples, the threshold is representative of an average number of entries (assessed over a time interval such as the average number of entries in the internal queue 625 over the last N microseconds where N might be 100 or other suitable value), and the throttling rate is changed only if the average exceeds the threshold. In other examples, the threshold is representative of the current number of entries, and so the throttling rate is changed whenever the current number of entries is found to exceed the threshold. As can be appreciated, other schemes may be used to adaptively adjust the throttling rate.

Actual pages of data to be delivered to the host device (such as the result of read commands) are delivered using one or more DMAs 626. Additional components of the NVMe controller 614 shown in FIG. 6 include a command fetcher 628, which is responsible for fetching and parsing the commands from the host and queuing them internally, a command executer 630, which is responsible for the arbitrating and executing the commands, a flash interface module 632, which is responsible for controlling and accessing the memory arrays, and an error correction module 634, which is responsible for error correction. Ingress and egress from the NVMe device 610 is illustrated via arrows 636 and 638.

Note that, in an exemplary implementation, the only components that are modified relative to conventional NVMe are the completion queue manager 618, which controls the throttling based on the current throttling rate, and the processor(s) 616, which set and adjust the throttling rate. The throttling described herein is otherwise transparent to all other components of the NVMe device 610, as well as the host device 600. That is, only minimal changes are made to otherwise standard NVMe systems to implement the throttling.

Figure 7:
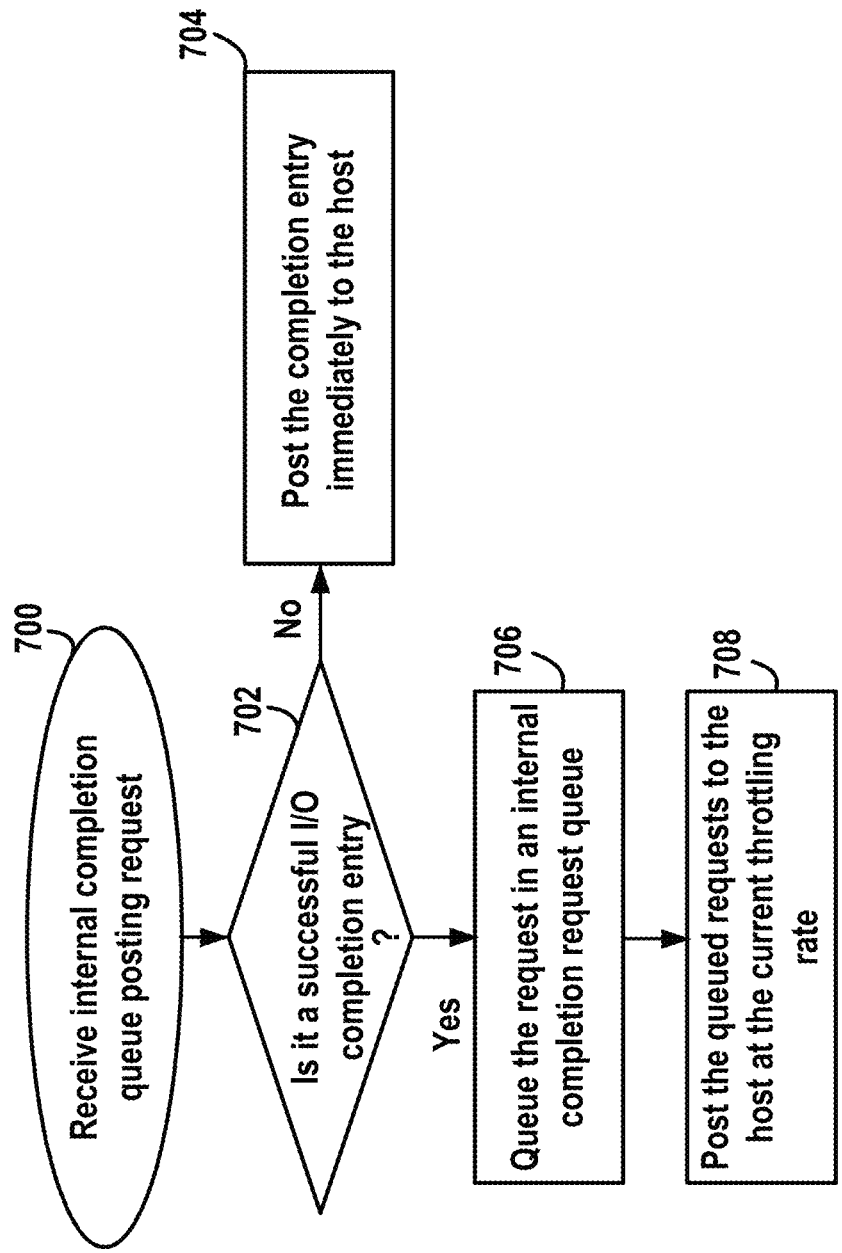
FIG. 7 is a flow chart illustrating selected features of the NVMe throttling procedure performed by the data storage controller of FIG. 6.

FIG. 7 is a flow diagram summarizing selected operational features of the NVMe system of FIG. 6. Briefly, at 700, an internal completion queue posting request is received and, if it is representative of a successful I/O completion entry (i.e. it is a simplified completion entry), as determined at 702, the completion entry is stored or queued within an internal completion request internal queue at 706 within the completion queue manager (such as internal queue 625 of FIG. 6). Otherwise, at 704, the completion entry is posted immediately (or as soon as feasible) to the host device. That is, the completion entry is posted substantially immediately if the entry is a full entry representative of an error condition or other full entry condition. Completion entries queued within the internal queue of 706 are posted to the host at the current throttling rate, at 708, using uniform time-delays between consecutive posts, as already explained.

Figure 8:
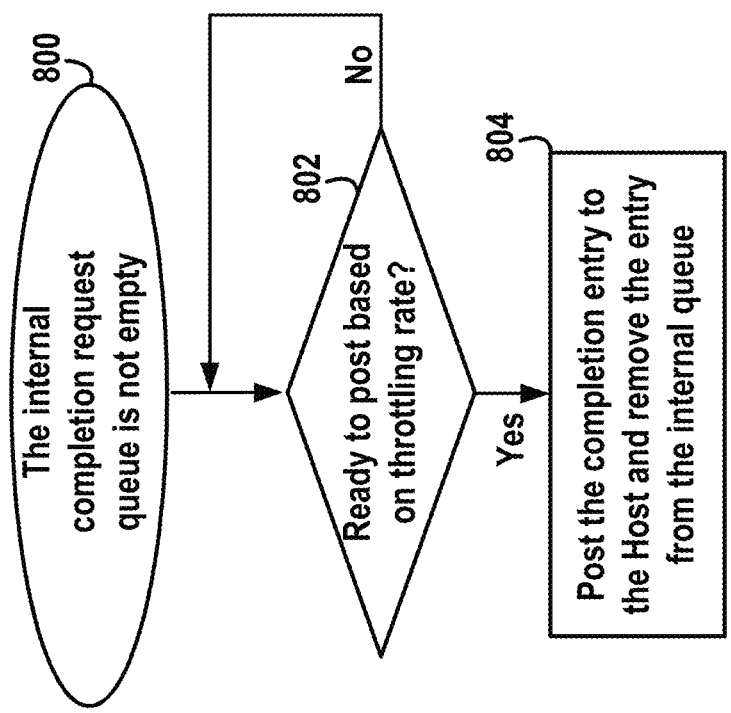
FIG. 8 is a flow chart further illustrating selected features of the NVMe throttling procedure performed by the data storage controller of FIG. 6.

FIG. 8 is another flow diagram summarizing selected operational features of the NVMe system of FIG. 6. Briefly, at 800, the illustrated operations begin with the internal completion request queue not empty (i.e. at least some entries have already been queued in the internal queue). If the completion queue manager is ready to post the next entry based on the current throttling rate, as determined at 802, the completion queue manager posts the next entry within the internal queue to the host, at 804, and removes that entry form the internal queue.

Figure 9:
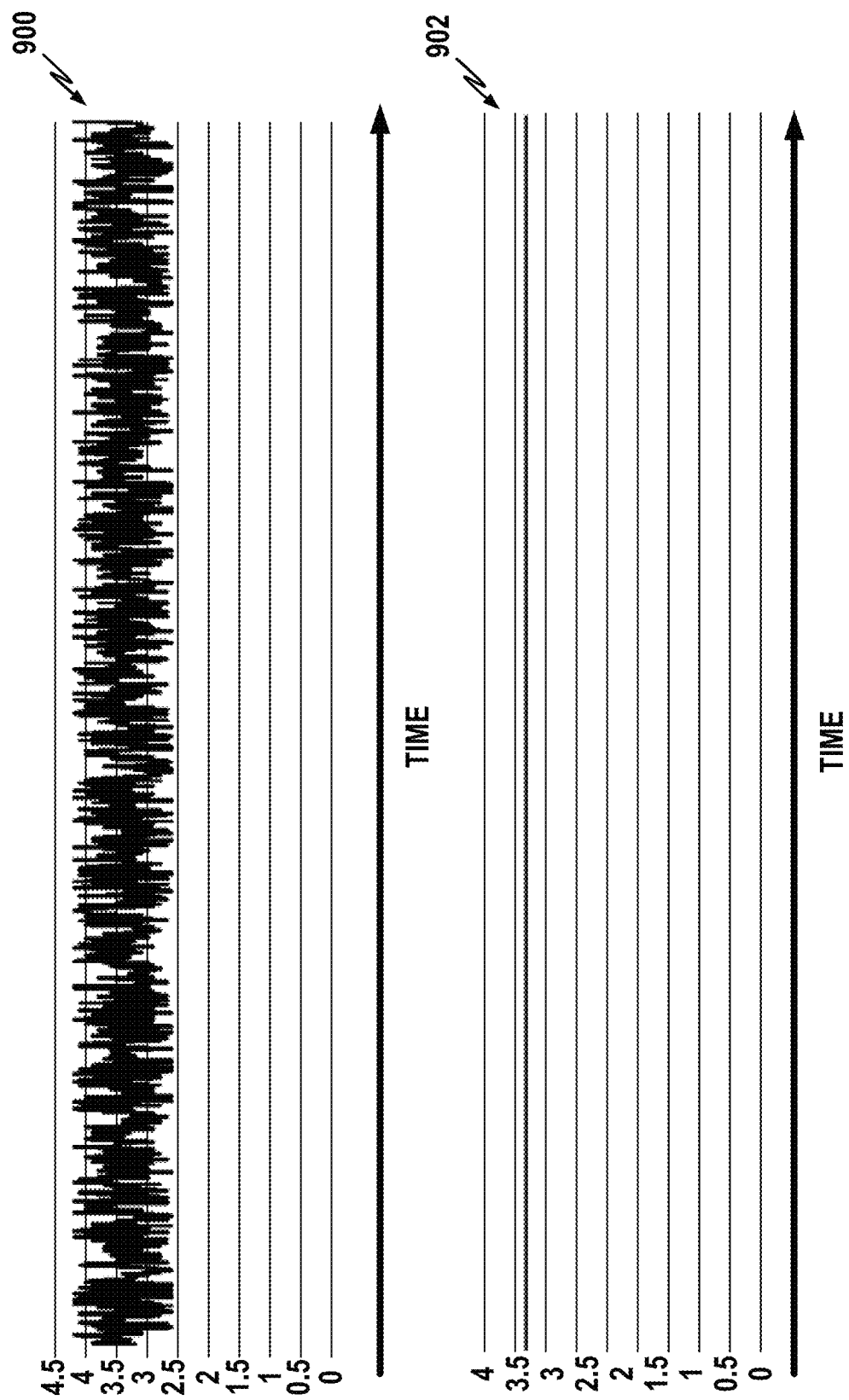
FIG. 9 graphically illustrates the stability and uniformity of the delivery of completion entry values that may be achieved with NVMe using completion entry throttling.

FIG. 9 illustrates the stabilization that maybe achieved by using the throttling techniques described herein. A graph 900 illustrates the rate of delivery of completion entries to a host device as a function of time (over a certain time interval) without throttling, with the vertical axis illustrating the delivery rate in gigabits (Gb). A graph 902 illustrates the rate of delivery of completion entries to the same host device as a function of time (over the same time interval) with throttling. As can be seen, without throttling, the rate of graph 900 is highly non-uniform (i.e. non-stable). With throttling, the rate of graph 902 is quite uniform and stable.

Further Exemplary Embodiments

Figure 10:
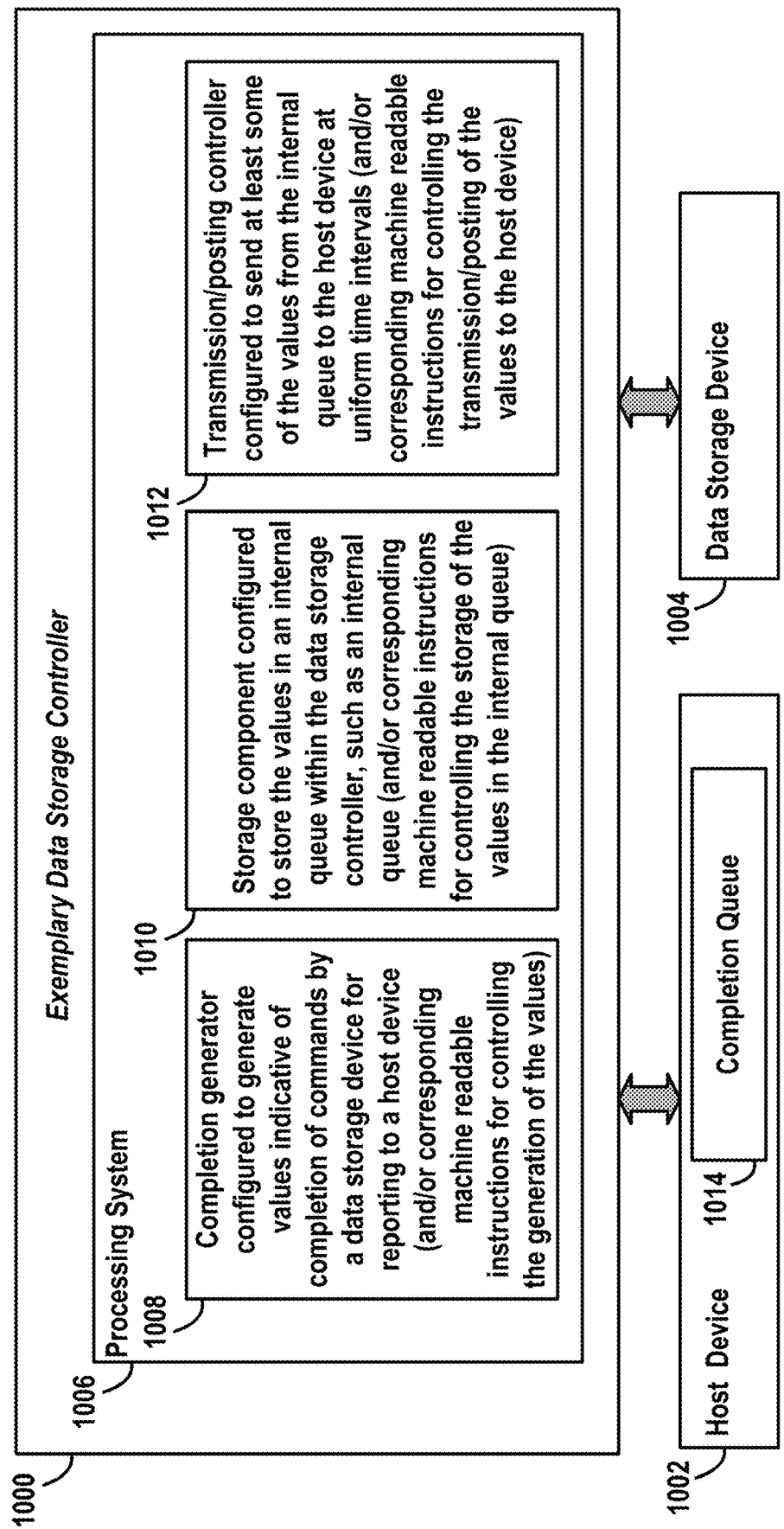
FIG. 10 is a block diagram summarizing selected features of a data storage controller equipped to throttle the delivery of completion entry values to a host device.
Figure 11:
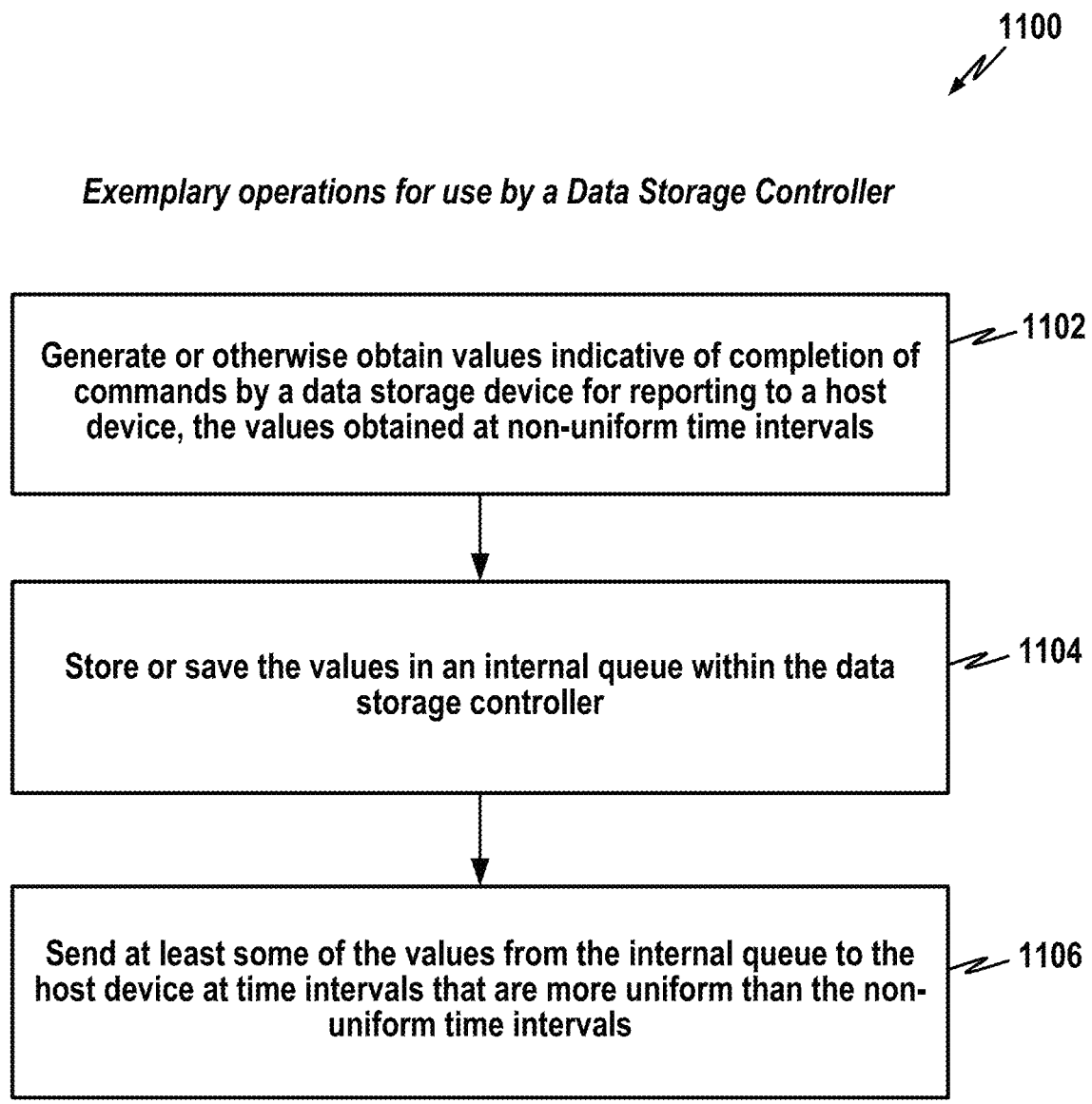
FIG. 11 is a high-level flow chart summarizing selected operations of a data storage controller equipped to throttle the delivery of completion entry values to a host device.
Figure 12:
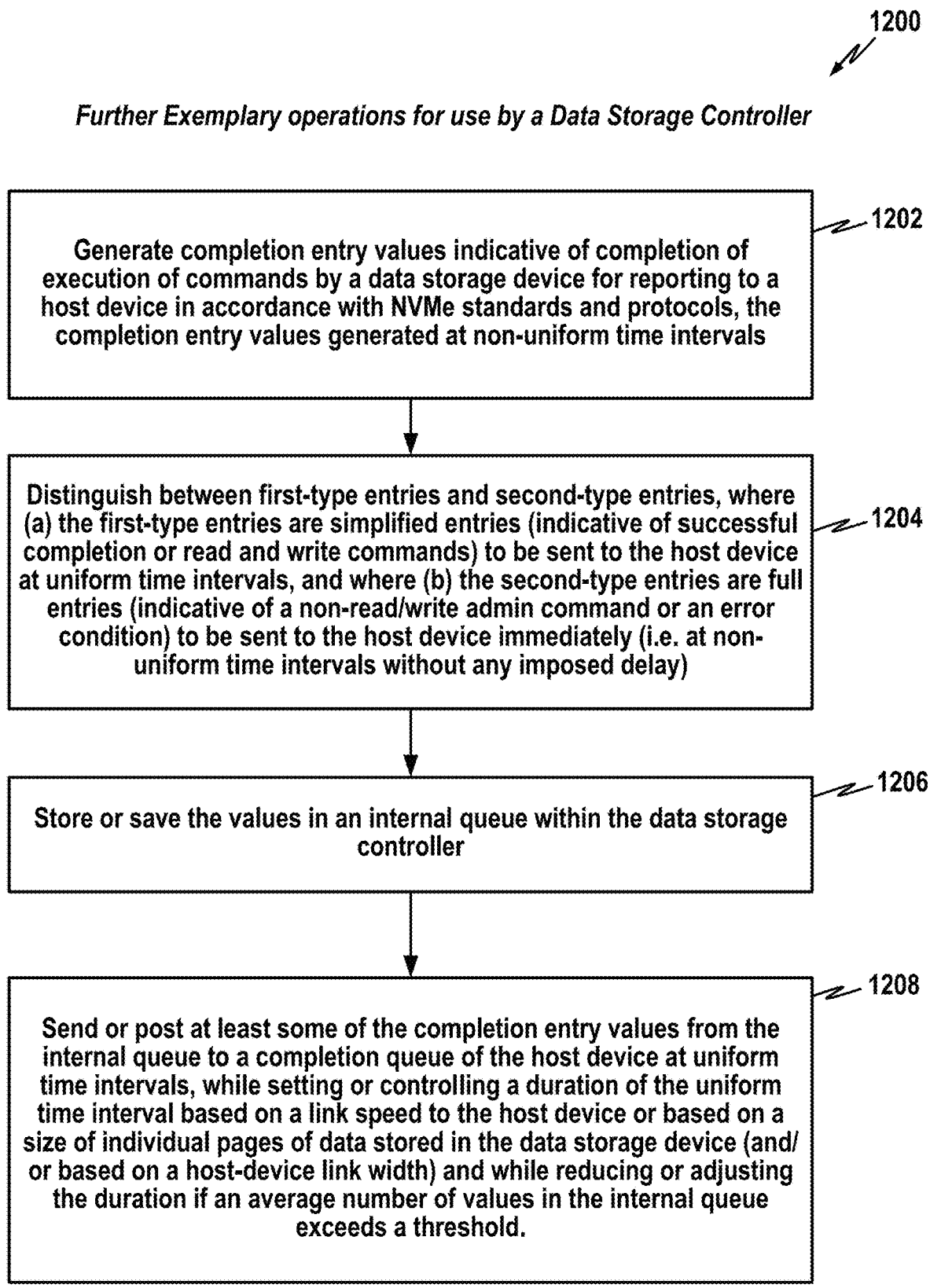
FIG. 12 is a flow chart summarizing further selected operations of a data storage controller equipped to throttle the delivery of completion entry values to a host device.

FIGS. 10-12 illustrate and summarize various general features of exemplary data storage controllers and methods, or procedures for use with data storage controllers.

FIG. 10 shows an exemplary data storage controller 1000 (or memory controller) configured to communicate with a host device 1002 and a data storage device 1004. Although many examples described herein relate to NVMe controllers for storing data within NAND devices, the data storage device 1004 may be any suitable memory or storage device and is not limited to NANDs, and the data storage controller 1000 may be any suitable memory controller device and is not limited to NVMe-based controllers.

The exemplary data storage controller 1000 of FIG. 10 includes a processor 1006 for controlling storage, retrieval and/or erasure of data within the data storage device 1004 and for controlling the posting or delivery of completion entry values or the like to the host device 1002. The exemplary processor 1006 includes a completion generator component or controller 1008 configured to generate or otherwise obtain values indicative of completion of commands by the data storage device 1004 for reporting or posting to the host device 1002. The values may be generated at generally non-uniform time intervals by the completion generator 1008. The processor 1006 also includes a storage component or controller 1010 configured to store the values in an internal queue within the data storage controller (such as an internal queue). The processor 1006 further includes a transmission/posting controller 1012 configured to send, transmit or post at least some of the values from the internal queue to the host device 1002 at uniform time intervals (i.e. at time intervals that are relatively more uniform than the time intervals with which the processing system generates the values), using techniques described above or other suitable throttling techniques. In the example of FIG. 10, the values are posted to a completion queue 1014 of the host device but this is just one example of a component of the host device that can be equipped to receive the values.

In at least some examples, means may be provided for performing the functions illustrated in FIG. 10 and/or other functions illustrated or described herein. For example, an apparatus (e.g. processing system 1006) may be provided for use with a data storage device (e.g. storage device 1004) where the apparatus includes: means (such as completion generator 1008) for generating or otherwise obtaining values indicative of completion of commands by a data storage device for reporting to a host device, the values generated or obtained at non-uniform time intervals; means for storing the values (such as storage component 1010) in an internal queue within the data storage controller; and means for sending (such as transmission/posting controller 1012) at least some of the values from the internal queue to the host device at time intervals that are more uniform than the non-uniform time intervals.

The host device may include a completion queue (1014), and the means for sending values to the host device may include a means for posting values (such as completion queue manager 618 of FIG. 6) from the internal queue to the completion queue of the host device at uniform time intervals. The values may be completion entries with each entry indicating execution of a respective command by the data storage device. The completion entries may include first-type entries and second-type entries, wherein the first-type entries are sent to the host device at uniform time intervals, and wherein the second-type entries are sent to the host device at non-uniform time intervals. The first-type entries may be simplified entries indicative of successful completion of a read or write command by the data storage device. The second-type entries may be full entries indicative of a non-read/write command or an error condition. The second-type entries may be sent to the host device by the data storage controller without any imposed delay. The apparatus may further include means for controlling a duration of the uniform time interval (such as the throttling control processor 616 of FIG. 6). The means for controlling the duration of the uniform time interval may set the duration based on a link speed to the host device or on a size of individual pages of data stored in the data storage device (with the throttling rate being set higher for faster link speeds or for larger page sizes so as to reduce the interval between completion postings and thereby increase the rate at which completion entries are posted to the host). The means for controlling the duration of the uniform time intervals may reduce the duration if a number of values in the internal queue exceeds a threshold, as described above.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

In at least some examples, a machine-readable storage medium may be provided having one or more instructions which when executed by a processing circuit causes the processing circuit to performing the functions illustrated in FIG. 10 and/or other functions illustrated or described herein. For example, instructions may be provided for: generating or otherwise obtaining values indicative of completion of commands by a data storage device for reporting to a host device, the values generated or obtained at non-uniform time intervals; storing the values in an internal queue within the data storage controller; and for sending at least some of the values from the internal queue to the host device at time intervals that are more uniform than the non-uniform time intervals.

The host device may include a completion queue, and the instructions for sending values to the host device may include instructions for posting values from the internal queue to the completion queue of the host device at uniform time intervals. The values again may be completion entries with each entry indicating execution of a respective command by the data storage device. The instructions may further include instructions for controlling a duration of the uniform time interval. The instructions for controlling the duration of the uniform time interval may set the duration based on a link speed to the host device or on a size of individual pages of data stored in the data storage device. The instructions for controlling the duration of the uniform time intervals may reduce the duration if a number of values in the internal queue exceeds a threshold, as described above. These are just some examples of suitable instructions for performing or controlling the various functions or operations.

FIG. 11 broadly summarizes exemplary operations 1100 for use by or with a data storage controller or other suitable device to process completion values. At 1102, the data storage controller generates or otherwise obtains values (such as completion entry values) indicative of completion of commands by a data storage device for reporting to a host device, the values obtained at non-uniform time intervals. At 1104, the data storage controller stores or saves the values in an internal queue within the data storage controller. At 1106, the data storage controller sends (e.g. posts or transmits) at least some of the values from the internal queue to the host device at time intervals that are more uniform than the non-uniform time intervals (e.g. the values are posted to the host device at time intervals that are more uniform than the non-uniform time intervals with which the values are generated by the data storage controller). As already discussed, the values may be posted to a completion queue of the host device using NVMe standards at a throttled rate.

FIG. 12 further summarizes exemplary operations 1200 for use by or with a data storage controller or other suitable device to process completion values. At 1202, the data storage controller generates completion entry values indicative of completion of execution of commands by a data storage device for reporting to a host device in accordance with NVMe standards and protocols, the completion entry values generated at non-uniform time intervals. At 1204, the data storage controller distinguishes between first-type entries and second-type entries, where (a) the first-type entries are simplified entries (indicative of successful completion or read and write commands) to be sent to the host device at uniform time intervals, and where (b) the second-type entries are full entries (indicative of a non-read/write admin command or an error condition) to be sent to the host device immediately (i.e. at non-uniform time intervals without any imposed delay). At 1206, the data storage controller stores or otherwise saves the values in an internal queue within the data storage controller. At 1208, the data storage controller sends (e.g. posts) at least some of the completion entry values from the internal queue to a completion queue of the host device at uniform time intervals, while setting or controlling a duration of the uniform time interval based on a link speed to the host device or based on a size of individual pages of data stored in the data storage device (and/or based on a host-device link width, which may be relate to page size) and while reducing or adjusting the duration if an average number of values (or some other measure of the number of values) in the internal queue exceeds a threshold.

By way of example, insofar as link speed is concerned, PCIe provides various "Gen" configurations with differing link speeds, e.g. GEN1 (2.5 gigatransfers/second (GT/s)), GEN2 (5.0 GT/s), GEN3 (8.0 GT/s), and GEN4 (16.0 GT/s). In some examples of block 1208 of FIG. 12, the faster the GEN link speed, the shorter the uniform time intervals between the postings to the host of the completion entries. For instance, for a GEN4 (16.0 GT/s) implementation, the uniform interval may be set to a duration only half as long as the duration used with a GEN3 (8.0 GT/s) implementation. That is, the configuration of the throttling mechanism may be dynamically changed in block 1208 to alter the duration of the uniform time intervals based on GEN link speed. Insofar as link width is concerned, different PCIe implementations may use a different number of host-device interface lanes (e.g., ×1, ×4, ×8, or ×12). In some examples of block 1208, the more lanes, the shorter the uniform time interval used by the system. For instance, for an implementation with eight lanes (×8), the uniform interval may be set to a duration only half as long as the duration used with a four lane (×4) implementation. That is, the configuration of the throttling mechanism may be dynamically changed during block 1208 to alter the duration of the uniform time intervals based on the number of PCIe lanes.

What has been discussed thus far primarily relates to methods and apparatus by which a data storage controller selectively throttles the delivery of completion entries to a host processor using uniform delivery intervals to provide for the stable delivery of completion entries to the host. As explained, rather than promptly posting completion entries to a completion queue of the host, the data storage controller selectively delays posting some completion entries relative to other completion entries, so the entries may be posted with uniform time delays. This may enable the host processor to more efficiently process the completion entries.

In the following, methods and apparatus are described wherein the data storage controller promptly posts completion entries to a completion queue of the host but sets indicators bits within the completion entries to cause the host to initially ignore the completion entries to thereby delay or throttle processing by the host of the completion entries.

Alternative Throttling Techniques and Embodiments

In some examples, the data storage controller selectively delays the reporting of new completion entries to the host by storing the new completion entries in the completion queue of the host while also initially setting corresponding indicator bits within the completion entries (e.g. phase tags) to cause the host to assume the new completion entries have already been processed and thus can be ignored. That is, the indicator bits are set to "trick" the host processing logic into initially assuming that the new entries are old entries, which have already been processed or consumed by the host and should be skipped.

In this manner, the new completion entries posted to the completion queue are initially rendered "invisible" to the host, and so the host ignores the entries. Later, the data storage controller resets the indicator bits to indicate that the entries are new entries that have not yet been processed, thus rendering the entries visible to the host to thereby cause the host to process the new completion entries. Herein, an entry is deemed to be "invisible" to the host if the entry is configured to be ignored by the host, and is "visible" otherwise. It should be understood that at least some "invisible" entries in the queue may be accessed by the host to read out the indicator bit (e.g. the phase tag) to determine whether the entry is old or new. That is, the entries are not literally invisible to the host. Rather, the entries are "practically invisible" since, in accordance with programming under applicable standards (e.g. NMVe), the host ignores the entries under the assumption that the entries have already been processed.

Using these techniques, the processing of completion entries within the host can be selectively throttled by the data storage controller. Moreover, since a host often delays posting new commands into its submission queues until the host has been notified that certain previous commands have been completed, the throttling of completion entry processing within the host by the data storage controller can also serve to throttle the posting of new commands into the submission queues. The throttling may be controlled to make the delivery of completion entries more uniform (as discussed in connection with FIGS. 1-12) or to achieve other goals, such as controlling power consumption or the like.

By promptly posting new completion entries into the completion queue within the host memory, rather than storing the entries temporarily in an internal queue within the data storage controller, the data storage controller need not maintain internal queues or buffers, such as queue 625 of FIG. 6, or at least the internal queues or buffers maintained within the data storage controller can be of smaller size. Notably, for some enterprise applications, there may be a thousand (1000) different completion queues, each with up to sixty-four thousand (64K) entries (though a far smaller number of entries per queue is often used). For client applications, 128 or 256 completion queues are common.

Significant savings thus may be achieved within the data storage controller in terms of cost, power, and complexity by avoiding the need to maintain corresponding internal queues or buffers for each of the completion entries. Furthermore, any entries stored within such internal queues or buffers may need to be backed up if the data storage controller enters a low power mode or encounters an error condition, and the need for such backups may add to device complexity and cost.

In some examples, the data storage controller controls the amount of throttling of the host by controlling the number of new completion entries posted in the completion queue with their indicator bits set to cause the host to ignore the entries as old. That is, the data storage controller controls the number of invisible entries. Once some threshold number of invisible entries has been reached, the data storage controller resets the bits of those entries to make them visible to the host so the entries may be processed. The threshold number of invisible entries may be adaptively adjusted by the data storage controller to modulate or control the amount of throttling. In other examples, the data storage controller instead waits a throttling delay interval before resetting the indicator bits of the invisible entries, where the throttling delay interval may be adaptively adjusted by the data storage controller to modulate or control the amount of throttling. Hence, in some examples, throttling is controlled by controlling the number invisible entries within the completion queue at any given time and, in other examples, throttling is controlled by controlling a time delay interval. Some data storage controllers may be configured to perform or control both.

Various exemplary techniques are described herein-below by which the data storage controller resets the indicators bits (e.g. phase tags) within the completion queues. In one example, a read-modify-write is performed to reset the indicator bit of a particular completion entry that has already been posted to the completion queue (and is currently invisible to the host). In another example, for each invisible completion entry in the completion queue, the data storage controller maintains a byte in its own memory that includes the indicator bit set to make the entry visible (e.g. the byte of the completion entry that includes the phase tag). To reset the indicator bit for the corresponding entry in the completion queue, the data storage controller writes the byte from its memory into the completion queue, thereby resetting the indicator bit and making the entry visible to the host.

In yet another example, where the host is configured to stop fetching entries from the completion queue when it reaches a first "old" entry (as with NVMe), only an earliest completion entry of a sequence of new completion entries has its indictor bit set to mark the entry as old and hence invisible. The remaining entries in the sequence have their indictor bits set to mark the entries as new. Even though these entries have indicators bits that mark the entries as new, the entries are still invisible to the host since the host stops fetching entries from the completion queue when it reaches a first "old" entry. The one new entry that is marked as old (even though it is new) thereby acts as a barrier to prevent the rest of the sequence of entries from being processed by the host. Thereafter, the data storage controller can make the entire sequence of entries visible to the host just by resetting the indicator bit of the first of the entries. In this manner, the barrier is removed, and the host will not only detect and process the first of the entries (whose indicator bit has been reset), but the host will then also proceed to detect and process the rest of the new entries in the sequence (since their indicators are already set to mark them as new entries). This barrier-based technique helps reduce the number of reset operations that need to be performed by the data storage controller and the amount of traffic between the data storage controller and the host. For example, if there are N entries in the sequence, then rather than performing N read-modify-write operations to reset the indicator bits within each of the N entries, the data storage controller may perform just one read-modify-write operation to reset the indicator bit of the first entry. More specifically, in one example, the data storage controller defines the throttling rate using multiple completion entries and acts accordingly. For instance, the throttling rate may be four completion entries every 50 μSec. In one particular example, the phase bits are as follows: (1) '0' (old entry); (2) '0' (invisible entry—barrier); (3) '1' (new entry); (4) '1' (new entry); (5) '1' (new entry); (6) '0' (invisible entry—barrier); (7) '1' (new entry); (8) '1' (new entry); (9) '1' (new entry); (10) '0' (invisible entry—barrier); (11) '1' (new entry); (12) '1' (new entry); (13) '1' (new entry). Then, every 50 μSec, the device removes a single barrier only.

In illustrative examples, the completion queue is a circular queue (as with NVMe) where head and tail pointers are maintained to track the locations within the queue of the beginning and end of a sequence of new (visible) entries. An additional virtual tail pointer is provided for internal use by the data storage controller to additionally track the end of a sequence of entries that are new but still invisible (e.g. new entries with indicator bits set to mark them as old entries). These pointers and other features will now be described in detail.

Illustrative examples herein employ NVMe but other standards may be applicable, such as NVMe over Fabrics (NVMeOF). NVMeOF replaces PCIe transport with a fabric technology, such as remote direct memory access (RDMA) or Fibre Channel (FC) fabric.

Figure 13:
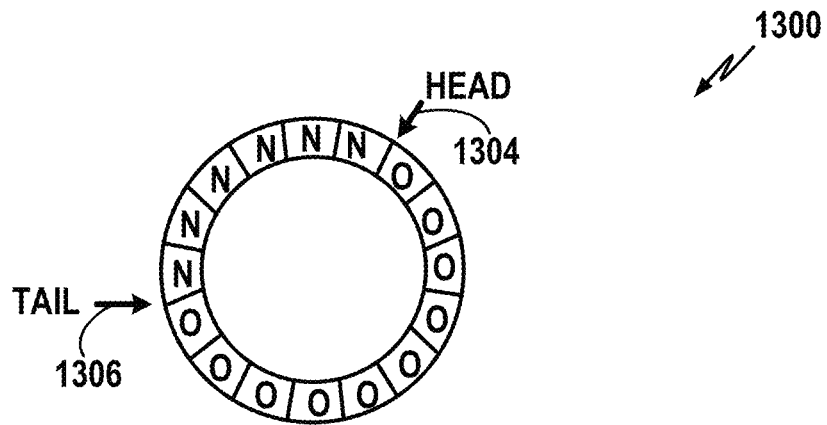
FIG. 13 illustrates exemplary circular completion queues and various pointers into the queues, including a virtual tail pointer that differs from a regular tail pointer.
Figure 13:
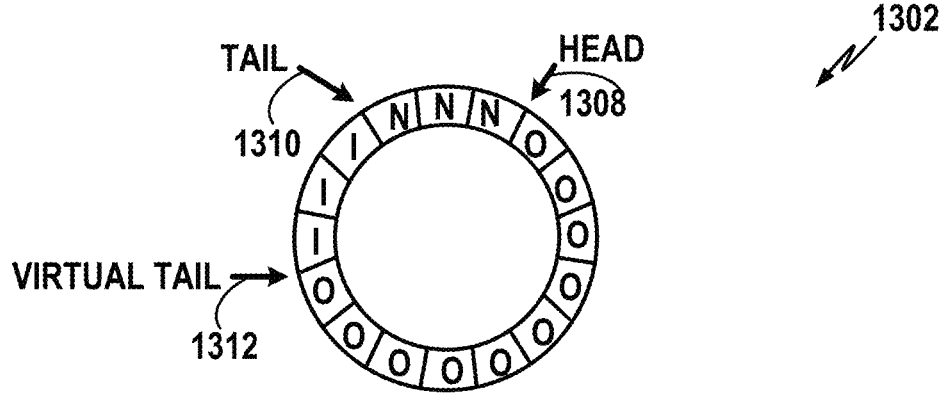

FIG. 13 illustrates exemplary circular completion queues 1300 and 1302 and corresponding pointers. (The queues are "circular" in terms of their function and operation but may be stored in memory in any suitable manner, such as by using a linear sequence of adjacent memory locations.)

Referring first to queue 1300, a head pointer 1304 identifies a first new entry (N) that has not yet been processed by the host (i.e. the oldest of the new entries) and a tail pointer 1306 identifies a last new entry that has not yet been processed by the host (i.e. the newest of the new entries). The head pointer 1306 is used by the host when reading the next completion entry. The tail pointer is used by the data storage controller when adding new entries to the queue. The other entries in the queue 1300 are all old (O) entries that have already been processed or consumed by the host.

In the illustration of FIG. 13 (and in other queue pointer illustrations of the figurers), for illustrative purposes the head pointer is shown as pointing to the beginning of the first new entry that has not yet been processed and the tail pointer is shown as pointing to the end of last new entry that has not yet been processed. The actual pointers are binary-encoded values or other suitable machine values maintained in the host and in the data storage controller, which "point" to entries stored in memory and may use counters with wrap-around. For instance, if the queue size is 10, the Head and Tail count from 0 to 9 and then back to 0.

Although not shown in queue 1300 of FIG. 13, a phase tag P (e.g. tag 512 of FIG. 5) of the completion entry may be used to indicate whether an entry is new. More specifically, in some NVMe examples, the phase tag values for all Completion Queue entries are initialized to '0' by host software prior to setting CC.EN to '1', where CC.EN is a Controller Reset. When the data storage controller places an entry in a completion queue, the data storage controller inverts the phase tag to enable host software to discriminate a new entry. Specifically, for the first set of completion queue entries after CC.EN is set to '1' all Phase Tags are set to '1' when they are posted. For the second set of completion queue entries, when the controller has wrapped around to the top of the completion queue, all Phase Tags are cleared to '0' when they are posted. The value of the Phase Tag is inverted each pass through the completion queue. In the example of FIG. 13, there are six new entries between the head and the tail. That is, the current queue depth is six.

In the example of queue 1300, all new entries are visible to the host and will be processed by the host in due course. The old entries are ignored by the host. The host processes new entries by fetching or reading out the oldest of the new entries, i.e. the entry identified by the head pointer 1304. Note that the host does not write to the completion queue. The host does not invert the value of the P bit. The host will know in the next queue wrap that the entry is old since in the next wrap the expected value for the P bit will be toggled (from '0' to '1' or '1' to '0'). The host updates the head pointer by, e.g., ringing a doorbell. The data storage controller may post new entries to the tail of the queue and the tail pointer 1306 is shifted accordingly (counter-clockwise in the example of FIG. 13). The data storage controller reports the change in the tail head pointer to the host. In this manner, both the host and the data storage controller maintain versions of the head and tail pointers, which are updated as needed to ensure that both devices use the same pointer values at the same time. If the host processes the entries faster than the data storage controller posts new entries, the queue depth will decrease. Conversely, if the data storage controller posts new entries faster than the host processes the entries, the queue depth will increase. If the host processes all entries before the data storage controller posts new entries, the queue becomes empty.

One option for throttling the host is for the data storage controller to delay posting new entries in the queue 1300 so that the queue becomes empty even though there are new entries to process. However, this method may require the data storage controller to maintain the new entries in a buffer or queue of the data storage controller, thus consuming memory and adding to burdens associated with saving information to NVM during low power modes or exception conditions. As noted, there might be a thousand completion queues and so a fairly large amount of data may need to be saved by the data storage controller.

Turning now to completion queue 1302, queue 1302 exploits an additional virtual tail pointer (maintained by the data storage device but not the host) that may be used to assist the data storage controller in throttling of the host without the need to save new entries in an internal buffer. A head pointer 1308 again identifies a first new entry (N) that has not yet been processed by the host (i.e. the oldest of the new entries). A tail pointer 1310 identifies a last new entry that has not yet been processed by the host and has been made visible to the host by the data storage controller. A virtual tail pointer 1312 identifies a last new entry that has not yet been processed by the host but is invisible (I) to the host. In FIG. 13, the designator "I" identifies entries in the queue that are new but invisible to the host. The virtual tail pointer 1312 is maintained by the data storage controller and not reported to the host. That is, the use of the virtual tail pointer 1312 is transparent to the host, and the host need not be modified to accommodate the virtual tail pointer 1312. Any applicable standards, such as NVMe standards, need not be modified to account for the virtual tail pointer 1312 either.

The virtual tail pointer 1312 identifies the end of the queue as tracked by the data storage controller, whereas the tail pointer 1310 identifies the end of the queue as tracked by the host. (The virtual tail pointer 1312 instead may be referred to as an invisible tail pointer, an internal tail pointer, a true tail pointer or by using other suitable terms. The tail pointer 1310 reported to the host instead may be referred to as a fake tail pointer, an external tail pointer, or a visible tail pointer or by using other suitable terms.)

Although not shown in queue 1302 of FIG. 13, the new completion entries may be designated as such by setting the phase tag of the completion entry to indicate that the entry is new. Likewise, the old completion entries may be designated as such by the data storage controller by inverting the phase tag of the completion entry to indicate that the entry is old. (As noted above, the host does not invert the value of the P bit.) Still further, the invisible completion entries (I) may be made invisible to the host by setting their phase tags to indicate that the entries are old, although the entries are actually new. Since the phase tags indicate the entries are old, the host ignores the entries. In the example of FIG. 13, there are six new entries between the head and the virtual tail. That is, the actual queue depth as seen by the data storage controller is six. However, the queue depth seen by the host is only three.

In the example of queue 1302, once the three new entries that are visible to the host have been processed, the host will ignore the remaining entries and assume the queue is empty. Later, after some delay, the data storage controller resets one or more of the invisible entries to mark the entries as new so that the host can then process those entries. In this manner, the data storage controller throttles the host by preventing the host from processing all of the new entries. As noted above, since a host often delays posting new commands into its submission queues until the host has been notified that certain previous commands have been completed, the throttling of completion entry processing within the host by the data storage controller can also serve to throttle the posting of new commands into the submission queues.

To summarize, with the arrangement of queue 1300, the data storage controller writes a completion entry to the host only once with the correct value for the P bit. With the arrangement of queue 1302, the data storage controller instead writes new entries to the tail of the queue but with the incorrect or old P value, which makes the entry invisible to the host. If the host fetches the entry, the host will drop it immediately assuming it is an old entry (from a previous queue wrap). With the arrangement of queue 1302, the data storage controller tracks two tail pointers: one known to the host and a second one known only to data storage controller (the virtual tail pointer). The distance between the two tail pointer represents the number of invisible entries in that particular completion queue. To convert an invisible entry into a visible entry, the data storage controller inverts the value of the P bit. This may be done later when it is time to notify the host about available entries based on a throttling mechanism or algorithm.

Figure 14:
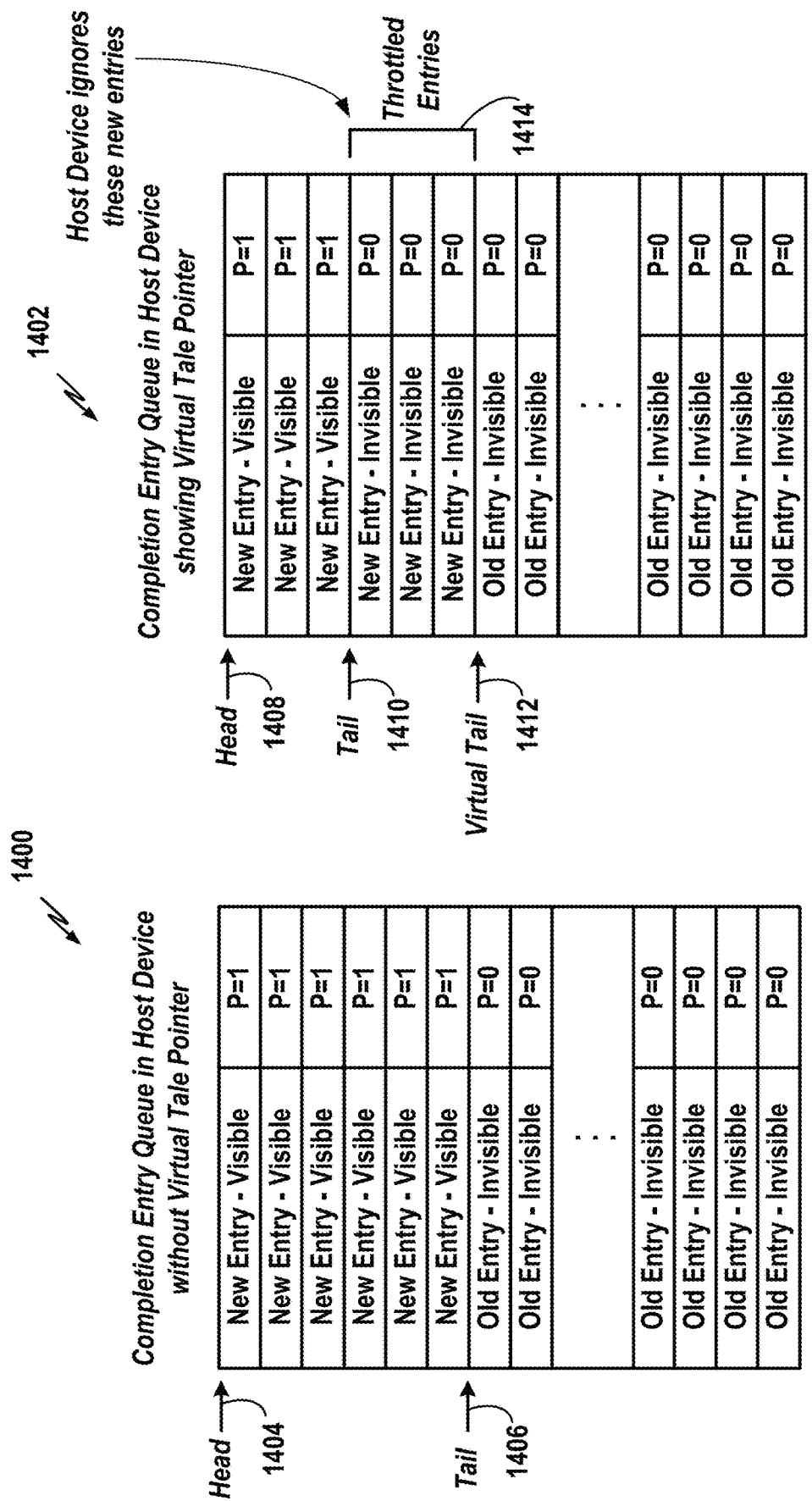
FIG. 14 illustrates exemplary completion queues and various pointers into the queues, including the virtual tail pointer, and also illustrates various phase tag (P-bit) indicators that indicate whether queue entries are visible or invisible to the host device.

FIG. 14 illustrate queue examples in which phase tags (P) are set to "1" to identify entries that are new and visible, but are set to "0" to indicate that the corresponding entries are either new and invisible or old (and thus also invisible). The queues may again be circular queues, but are shown in FIG. 14 in a linear form to more clearly illustrate the phase tags.

Referring first to completion queue 1400, which may correspond to queue 1300 of FIG. 13, a head pointer 1404 identifies a first new entry that is visible and has not yet been processed by the host and a tail pointer 1406 identifies a last new entry that is visible and has not yet been processed by the host. Each of the entries between the head and tail (inclusive) have phase tags (P) set to "1" to mark the entries as new and visible to the host. The other entries in the queue 1400 are all old entries that have already been processed or consumed by the host and hence are effectively invisible to the host. In the example of FIG. 14, there are six new entries between the head and the tail. That is, the current queue depth is six.

Completion queue 1402 illustrates the additional virtual tail pointer (maintained by the data storage device but not the host) that may be used to assist the data storage controller in throttling of the host without the need to maintain new entries in an internal buffer. A head pointer 1408 again identifies a first new entry that has not yet been processed by the host and is visible to the host (e.g. P=1). A tail pointer 1410 identifies a last new entry that has not yet been processed by the host and is visible to the host (e.g. P=1). A virtual tail pointer 1412 identifies a last new entry that has not yet been processed by the host but is invisible to the host (e.g. P=0). The other entries in the queue 1402 are again old entries that have already been processed or consumed by the host (e.g. P=0) and hence are effectively invisible to the host (since P=0). Hence, the virtual tail pointer 1412 again identifies the end of the queue as seen by the data storage controller, whereas the tail pointer 1410 identifies the end of the queue as seen by the host. In the example of FIG. 14, there are six new entries between the head and the invisible tail. That is, the actual queue depth as seen by the data storage controller is six. However, the queue depth seen by the host is only three. The three new entries that are invisible to the host represent throttled entries 1414.

Figure 15:
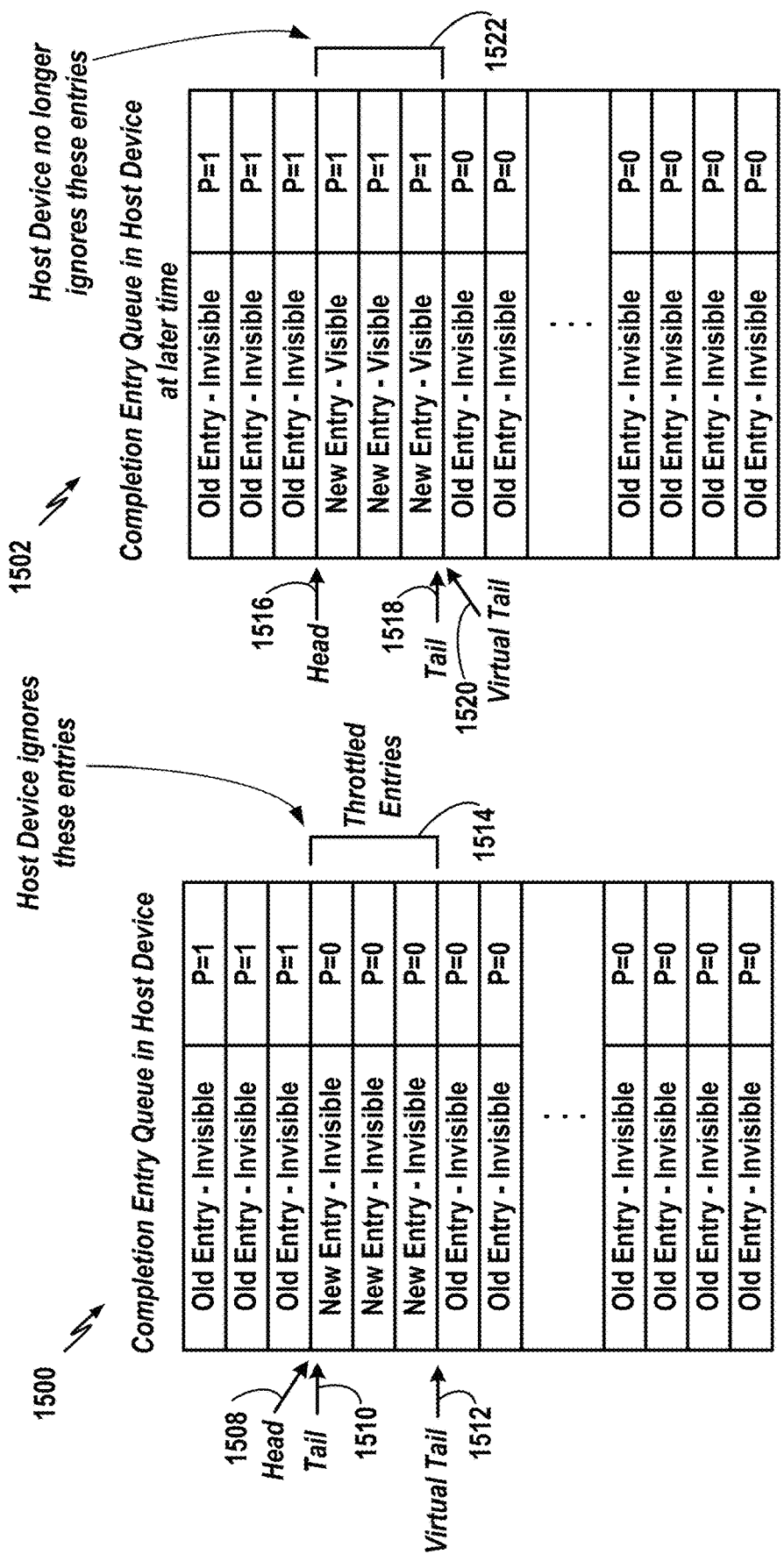
FIG. 15 illustrates exemplary completion queues and the use of phase tag (P-bit) indicators to render individual entries invisible to the host device.

FIG. 15 illustrates the circular queue with the virtual tail pointer after additional processing. Referring to completion queue 1500, the same queue 1402 of FIG. 14 is shown following a period of time during which the host has processed the three new and visible entries. Note that, although the first three entries have been processed by the host and hence are old, these entries still have P=1. As noted above, the host does not change P values after an entry is processed. The host updates the head pointer by ringing the doorbell. In FIG. 15, the head pointer 1508 has been reset to reflect the processing of the three entries and is now equal to the tail pointer 1510. In the example, the next three new entries 1514 are still marked invisible (e.g. P=0) and are ignored by the host. That is, the host concludes the queue is empty and there are no new entries to process. The virtual tail pointer 1512 maintained by the data storage controller continues to track the tail of the new (invisible) entries in the queue. During this time, the host is being throttled since it cannot process the new (invisible) entries.

Turning next to completion queue 1502, the queue is shown following a delay interval. The data storage controller has now reset the three invisible entries to be visible to the host. Hence, the three previously invisible entries are now listed as new and visible and with P=1. The head pointer 1516 has not changed but the tail pointer 1518 has been reset to be equal to the virtual tail pointer 1520 so that the queue depth has seen by the host is now three. The host no longer ignores the previously throttled entries 1522, which are processed in due course. It should be understood that, at some point in time, the data storage controller will likely post additional completion entries (not shown) into the queue, which will overwrite old entries beginning at the current virtual tail pointer location. Depending upon whether further host throttling is needed, the additional new entries might be set invisible (e.g. P=0) or set visible (e.g. P=1) by the data storage controller.

Insofar as resetting the P-tag indicator bit of a completion entry is concerned, at least two different reset procedures may be used. These procedures are particularly useful within systems that do not allow for an individual bit write to invert just the P-bit value, such as current versions of PCI, which do not allow for individual bit read or writes.

A first reset procedure uses a byte-granularity read-modify-write in order to invert the value of the P-bit. To invert the value of the P-bit, the data storage controller fetches one byte of data from the completion entry in the queue (e.g. the second byte of the status field of the completion entry that contains the P-bit). The data storage controller inverts (or toggles) the P-bit within that byte and then writes the byte back to the same location within the completion queue using a one-byte write transaction. For systems that permit a single bit write, then just the new P-bit value may be written.

A second reset procedure utilizes pre-stored (aggregated) bytes in the data storage controller. To invert the value of the P-bit, the data storage controller maintains internally (e.g. within a DRAM of the data storage controller) one pre-stored byte per completion queue entry, which holds the inverted P-bit. When it is the time to notify the host that the completion entry is available for processing, the internally held byte (which includes the inverted value of the P-bit) is written to the host using a one-byte write transaction. A possible advantage of this second procedure compared to the first procedure is that the second procedure does not require a read followed by a write and hence can reduce latency. A possible drawback of the second procedure compared to the first procedure is that an internal database is employed within the memory of the data storage controller for each completion queue to store the bytes, thus consuming memory resources and adding to the amount of data to save in case of entry to low power mode. Nevertheless, compared to an implementation wherein entire completion entries (e.g. sixteen byte entries) are stored in the data storage controller, significant storage savings can be achieved.

Figure 16:
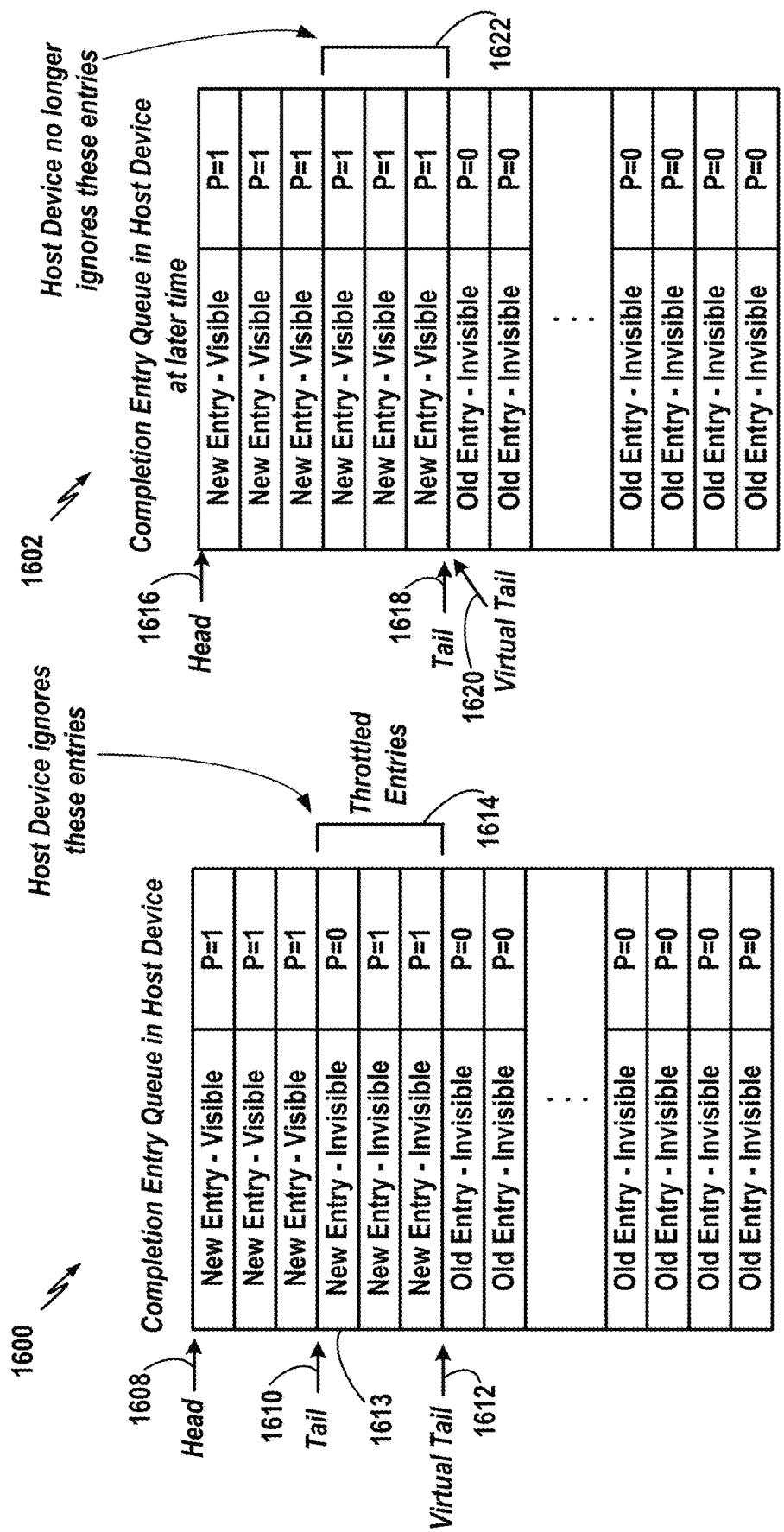
FIG. 16 illustrates exemplary completion queues and the use of an initial phase tag (P-bit) indicator as a barrier to render subsequent entries invisible to the host device.

FIG. 16 illustrates an alternative embodiment where only a first entry in a sequence of new entries has its phase bit set to "1" but the host nevertheless ignores the rest of the sequence of new entries. Referring to completion queue 1600, a head pointer 1608 identifies a first new entry that has not yet been processed by the host and is visible to the host (e.g. P=1). A tail pointer 1610 identifies a last new entry that has not yet been processed by the host and is visible to the host (e.g. P=1). A virtual tail pointer 1612 identifies a last new entry that has not yet been processed by the host but is invisible to the host. In contrast to the previous examples, only the first entry 1613 of a series of entries 1614 to be throttled has its phase tag set to make it invisible (e.g. P=0). The other entries to be throttled (in this example, the next two entries after entry 1613) have phase tags set to mark the entries as new (e.g. P=1). Although these next two entries have P=1, the host still ignores them because the host stops processing when it reaches the entry 1613. That is, the next two entries are still invisible to the host even though they are marked as new (e.g. P=1). In this example, the host stops processing when it sees a P=0 entry because it interprets that entry as an old entry and concludes the following entries are likewise old. This assumes, of course, the host is configured to stop processing when it reaches the first "old" entry. At least some NVMe standards specify that the host should stop processing when it reaches an old entry and so the technique may be useful in systems configured in accordance with those standards. For other devices or standards, it may instead be appropriate to use the procedure of FIG. 15 where each new entry that is intended to be invisible to the host is explicitly marked as old.

Note that the other entries in the queue 1600 that have P=0 are old entries that have already been processed or consumed by the host and hence are invisible to the host since the host stops search for new entries at entry 1613. Hence, the virtual tail pointer 1612 again identifies the end of the queue as seen by the data storage controller, whereas the tail pointer 1610 identifies the end of the queue as seen by the host. In the example of FIG. 16, there are six new entries. That is, the actual queue depth as seen by the data storage controller is six. However, the queue depth seen by the host is only three. The three new entries that are invisible to the host represent throttled entries 1614.

Turning next to completion queue 1602, the queue is 1602 shown at a later time following a delay interval. The data storage controller has now reset the three previously invisible entries to be visible to the host. Hence, the three previously invisible entries are now listed as new and visible (e.g. P=1). The head pointer 1616 has not changed but the tail pointer 1618 has been reset to be equal to the virtual tail pointer 1620. The host no longer ignores the previously throttled entries 1622, which are processed by the host in due course.

Figure 17:
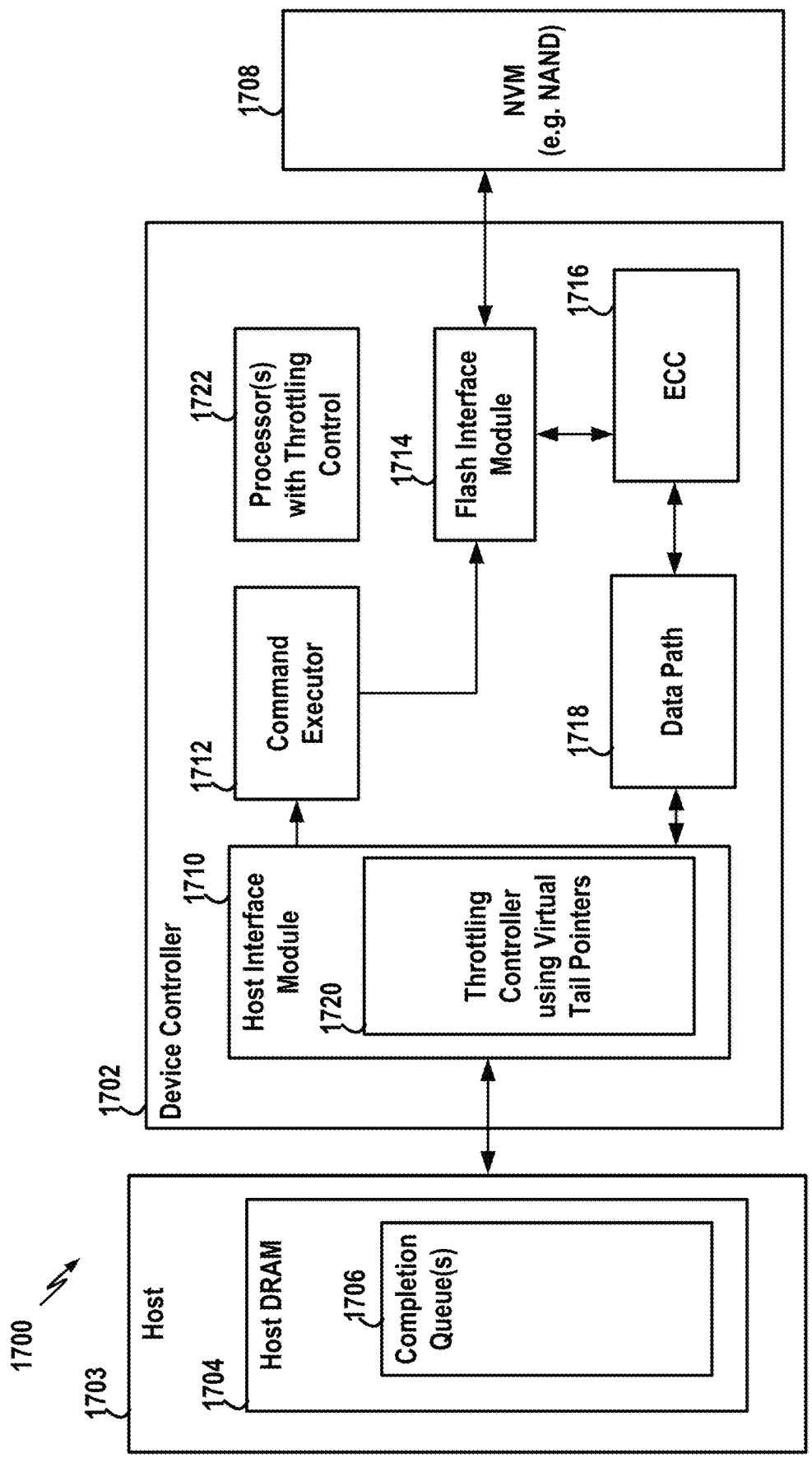
FIG. 17 summarizes a system having a host and a device controller equipped with a throttling controller that uses virtual tail pointers.

FIG. 17 illustrates at a high level a system 1700 that performing host throttling using virtual tail pointers. Briefly, the system 1700 includes a data storage controller or device controller 1702 that communicates with a host 1703 that includes a host DRAM 1704, which includes one or more completion queues 1706. The host is the master of the system 1700. The device controller 1702 implements completion throttling using the host DRAM 1704 rather than having additional databases in the device, such as queue 625 of FIG. 6.

The device controller 1702 is also coupled to an NVM 1708, which may be a NAND. The device controller 1702 is responsible for the interaction with the host 1703 on one side while managing and interfacing with the NVM 1708 on the other side. Commands are received by the device controller 1702 from the host 1703 via a host interface module 1710, which is responsible for communications with the host 1703 and which routes the commands to a command executor 1712, which is responsible for the arbitrating, scheduling and executing the commands. Read or write commands to the NVM 1708 may be processed using a flash interface module 1714, which is responsible for controlling and accessing the NVM 1708. Data read from the NVM 1708 is processed using an ECC module 1716 and then routed via a data path 1718, which is responsible for data transfer between host 1703 and the device controller 1702 (and which may include DMAs, not shown). One or more processors 1722 control the overall operation of the device controller 1702 including the execution of frond-end and back-end tasks. Completion entries are posted by the host interface module 1710 into the completion queues 1706 under the controller of a throttling controller 1720 that uses virtual tail pointers to track completion entries that have been posted to the completion queues 1706 but remain temporarily invisible to the host 1703, as already explained.

Figure 18:
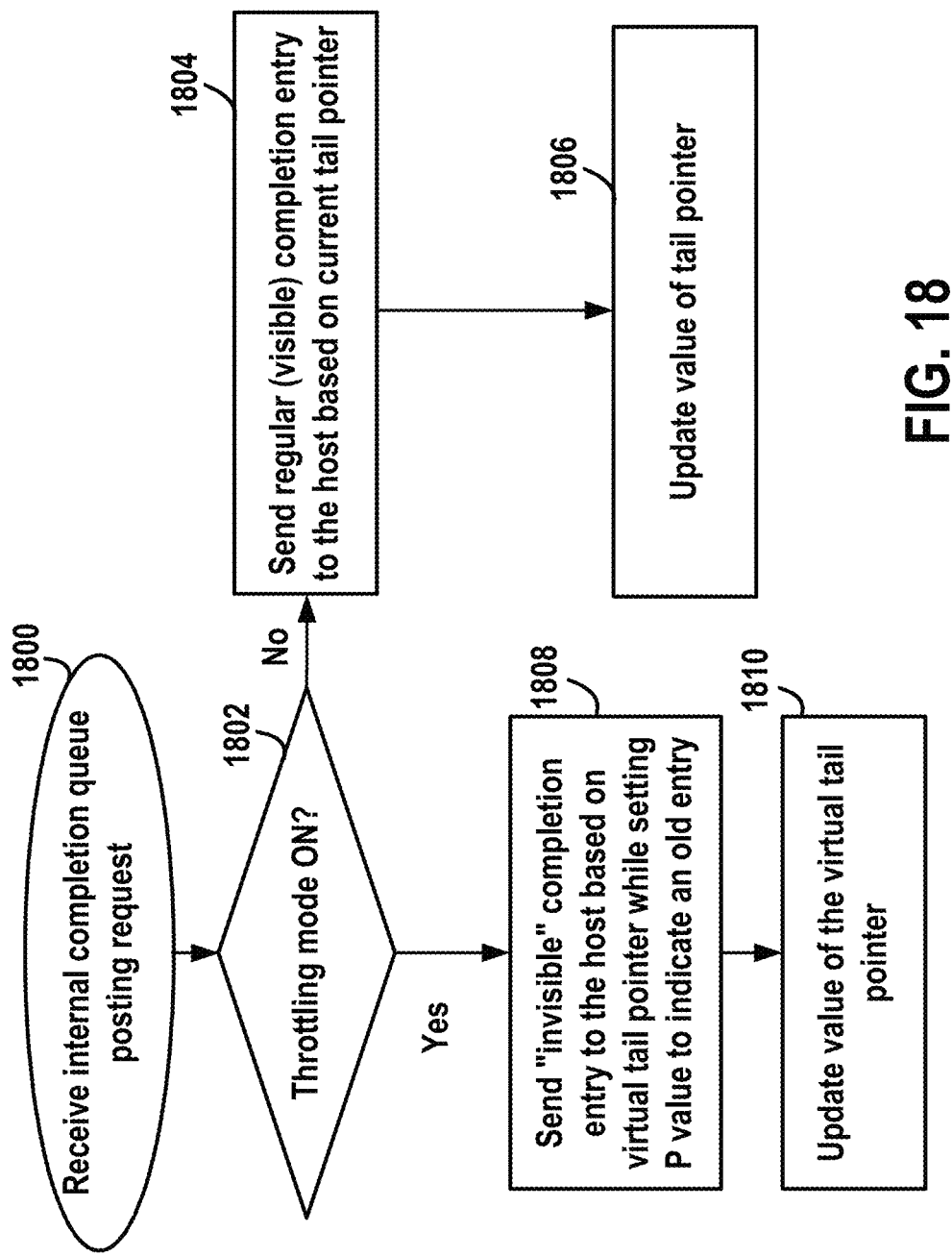
FIG. 18 summarizes a method for posting entries into a host completion queue while tracking a virtual tail pointer.

FIG. 18 summarizes operations that may be performed by the throttling controller 1720 of FIG. 17 or other suitably-equipped components or modules for posting entries into a host completion queue while tracking a virtual tail pointer. Briefly, at block 1800, an internal completion queue posting request is received (e.g. along the data path) by the throttling controller. If a throttling mode has not been turned on, as determined by the throttling controller at block 1802, the completion entry is sent by the throttling controller at block 1804 to the host completion queue of the host as a regular (visible) completion entry, with the entry posted into the queue at a location based on the current (regular) tail pointer. Once posted, the throttling controller updates the value of the tail pointer at block 1808.

If the throttling mode has been turned on, as determined at block 1802, the completion entry is sent by the throttling controller at block 1808 to the host completion queue of the host as an invisible completion entry, with the entry posted into the queue at a location based on the current virtual tail pointer and with the P value of the entry set to indicate the entry is an old entry (and thus ignored by the host). Once posted, the throttling controller updates the value of the virtual tail pointer at block 1810. Although not shown in FIG. 18, processing may return to block 1800 after either block 1806 and 1810.

FIG. 18 thus summarizes the flow for posting visible and invisible completion entries to the host. When the throttling mode is disabled or when no entries are currently being throttled, completion entries are posted to the completion queue based on the value of the tail pointer known to the host and with the usual "correct" P-bit value. Otherwise, the entry is posted to the completion queue with an "incorrect" or old P-bit value. The entry is posted to a location pointed by the virtual tail pointer (known only to the data storage controller) and the virtual tail pointer is then updated.

Figure 19:
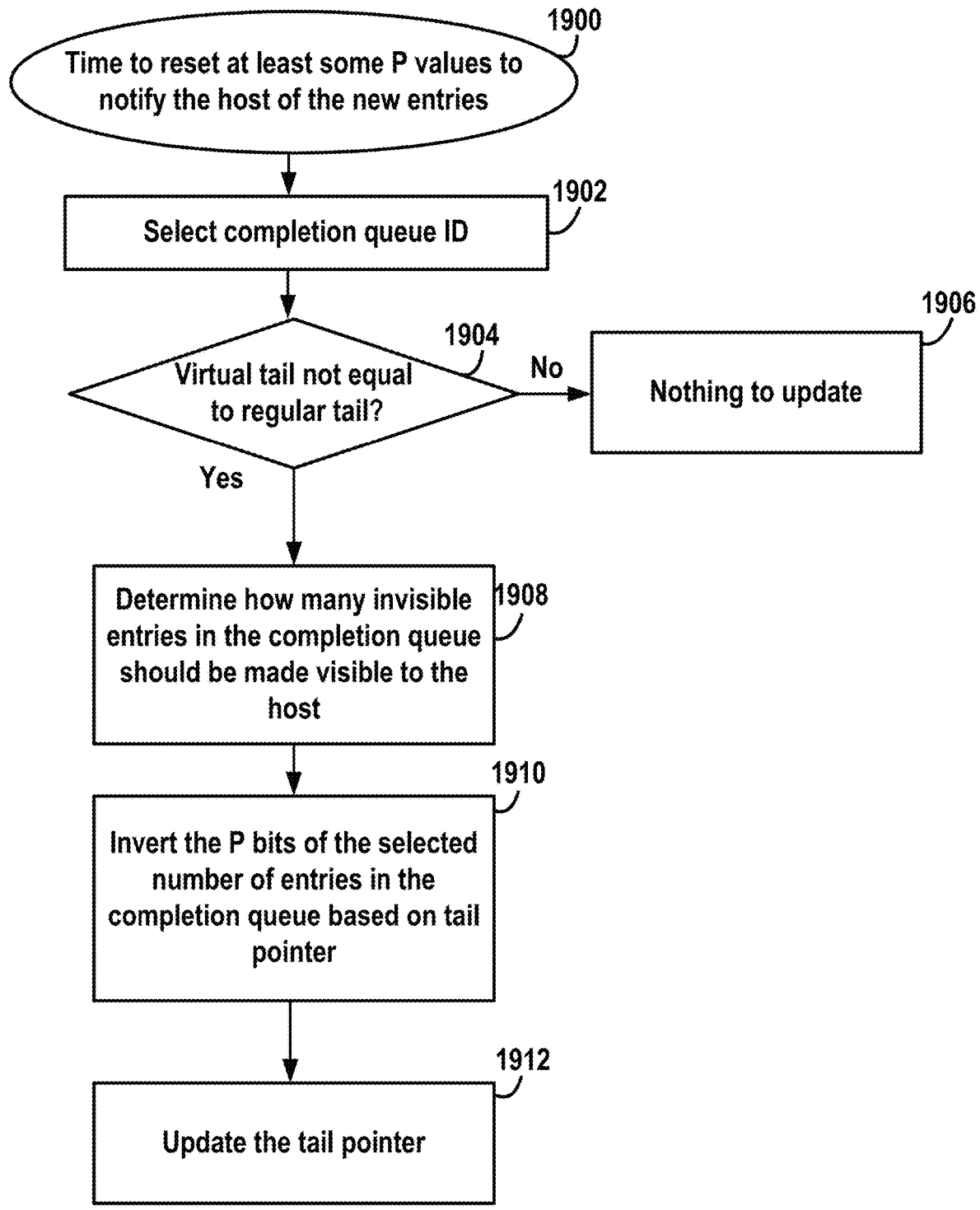
FIG. 19 summarizes a method for controlling the resetting of invisible entries to visible entries in a host completion queue.

FIG. 19 summarizes operations that may be performed by the throttling controller 1720 of FIG. 17 or other suitably-equipped components or modules for controlling the resetting of invisible entries to visible entries in a host completion queue. Briefly, at block 1900, the throttling controller determines whether and when to notify the host that one or more new completion entries are available within the completion queue that are currently invisible. For example, the throttling controller may determine that it is time to notify the host of the entries after some throttling delay interval has elapsed. Such time intervals may be controlled as discussed above to make host processing more uniform, or to achieve other goals, such as to selectively slow down host processing of completion entries or to speed up host processing of completion entries. In other examples, the throttling controller may track a total number of currently invisible (new) entries within the completion queues and determine that it is time to notify the host of the entries if the total number exceeds some predetermined threshold. In any case, the processing shown in FIG. 19 begins at a time when the throttling controller has determined that it is time to notify the host of such entries.

At block 1902, the throttling controller selects a completion queue ID, which identifies a particular completion queue within the host to examine. The throttling controller then determines, at decision block 1904, whether there are any invisible entries currently in the selected queue. This may be determined, as shown, by determining whether the regular tail pointer for that queue (known to the host) and the virtual tail pointer for that queue (known only to the data storage controller) both point to the same entry (i.e. whether the two pointers the same). If the two pointers are the same, then there are no invisible entries in the queue to expose to the host and so there is nothing to update in this scenario (as indicated in block 1906). If the two pointers are not the same, there are at least some such invisible entries in the selected queue. For example, if the virtual tail pointer differs from the regular tail pointer by three queue locations, then there are three invisible entries (that is, entries that are new to the host but which are currently invisible to the host).

At block 1908, the throttling controller determines or chooses how many invisible entries in the completion queue should be made visible to the host (i.e. reset from invisible to visible). That is, the throttling controller selects some number of invisible entries to make visible to the host. The determination may be made based on the amount of continued throttling desired by the throttling controller. For example, if the throttling controller wants to continue to throttle the host, the throttling controller may choose to not reset any of the invisible entries. If the throttling controller wants to cease any throttling (at least for the currently selected completion queue), the throttling controller may choose to reset all of the currently invisible entries to expose them all to the host. Intermediate levels of throttling may be achieved by resetting some intermediate number of the currently invisible entries.

At block 1910, the throttling controller inverts the P bits of the selected number of entries in the completion queue based on tail pointer. For example, if the throttling controller has decided to expose three currently invisible entries in the queue, the throttling controller begins at the current tail pointer location and inverts the P bits of the next three entries. At block 1912, the throttling controller updates the tail pointer. If the throttling controller has chosen to expose all of the previously invisible entries to the host, then the tail pointer and the virtual tail pointer will now be the same. If the throttling controller has chosen to expose fewer than all of the previously invisible entries to the host, then the tail pointer and the virtual tail pointer will still differ by some number of entries. Although not show in FIG. 19, processing may return to block 1900 after either block 1906 and 1912.

FIG. 19 thus summarizes the flow for completion notification to a host. If a selected completion queue holds invisible entries, the device controller performs the following operations: a) determine the number of completion entries to be made visible to the host; 2) invert the P bits of the relevant entries in host memory pointed by tail pointer; and 3) updates the value of the tail pointer accordingly.

Figure 20:
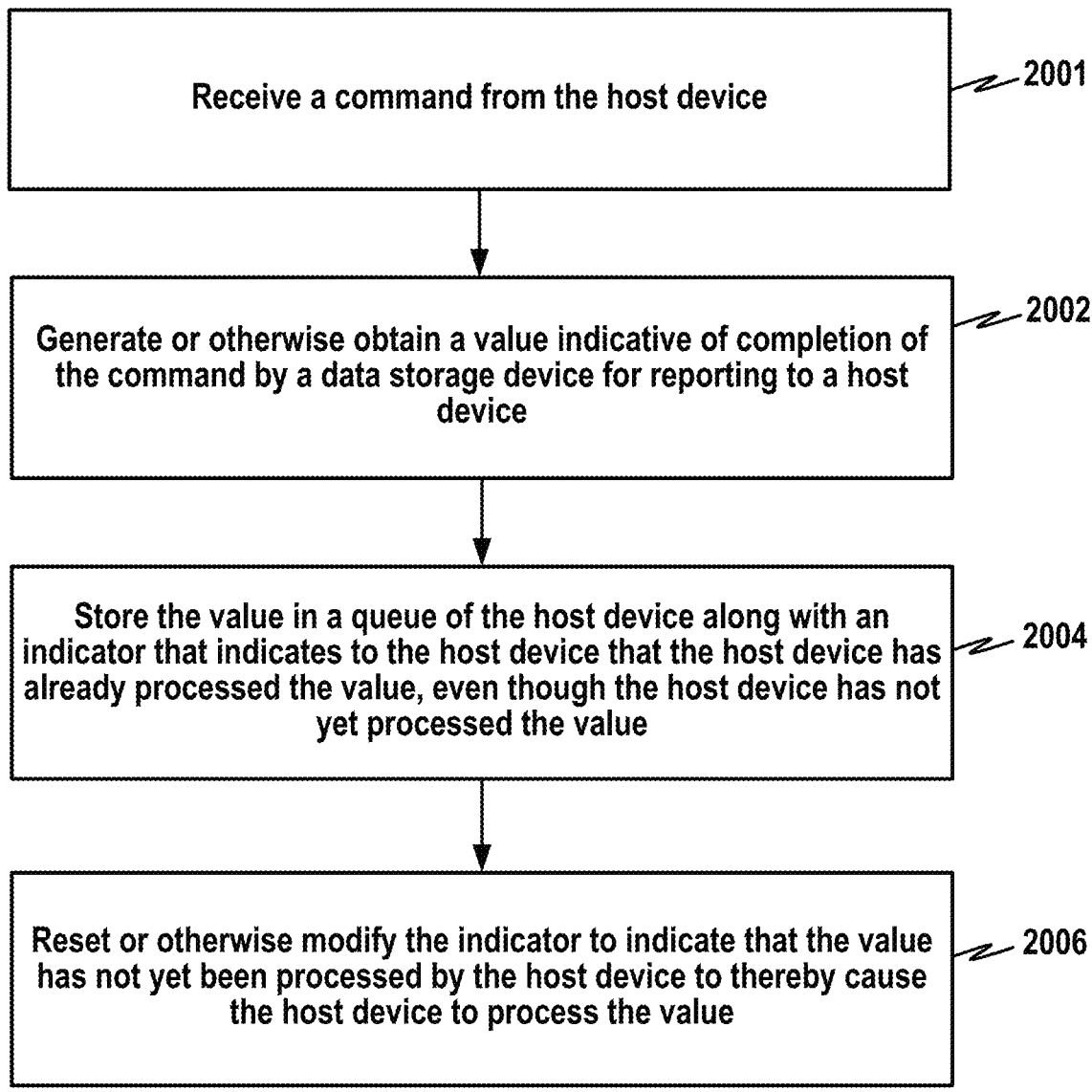
FIG. 20 is a high-level flow chart summarizing selected operations of a data storage controller equipped to throttle the processing of completion entry values by a host device by setting and re-setting certain indicator values in a completion entry queue.

FIG. 20 summarizes operations 2000 that may be performed by a data storage controller or other suitably-equipped apparatus or device. Briefly, at block 2001, the data storage controller receives a command from the host device. At block 2002, the data storage controller generates or otherwise obtains a value indicative of completion of the command by a data storage device for reporting to a host device. At block 2004, the data storage controller stores the value in a queue of the host device along with an indicator set to indicate to the host device that the host device has already processed the value, even though the host device has not yet processed the value. At block 2006, the data storage controller resets or otherwise modifies the indicator to indicate that the value has not yet been processed by the host device to thereby cause the host device to process the value.

Figure 21:
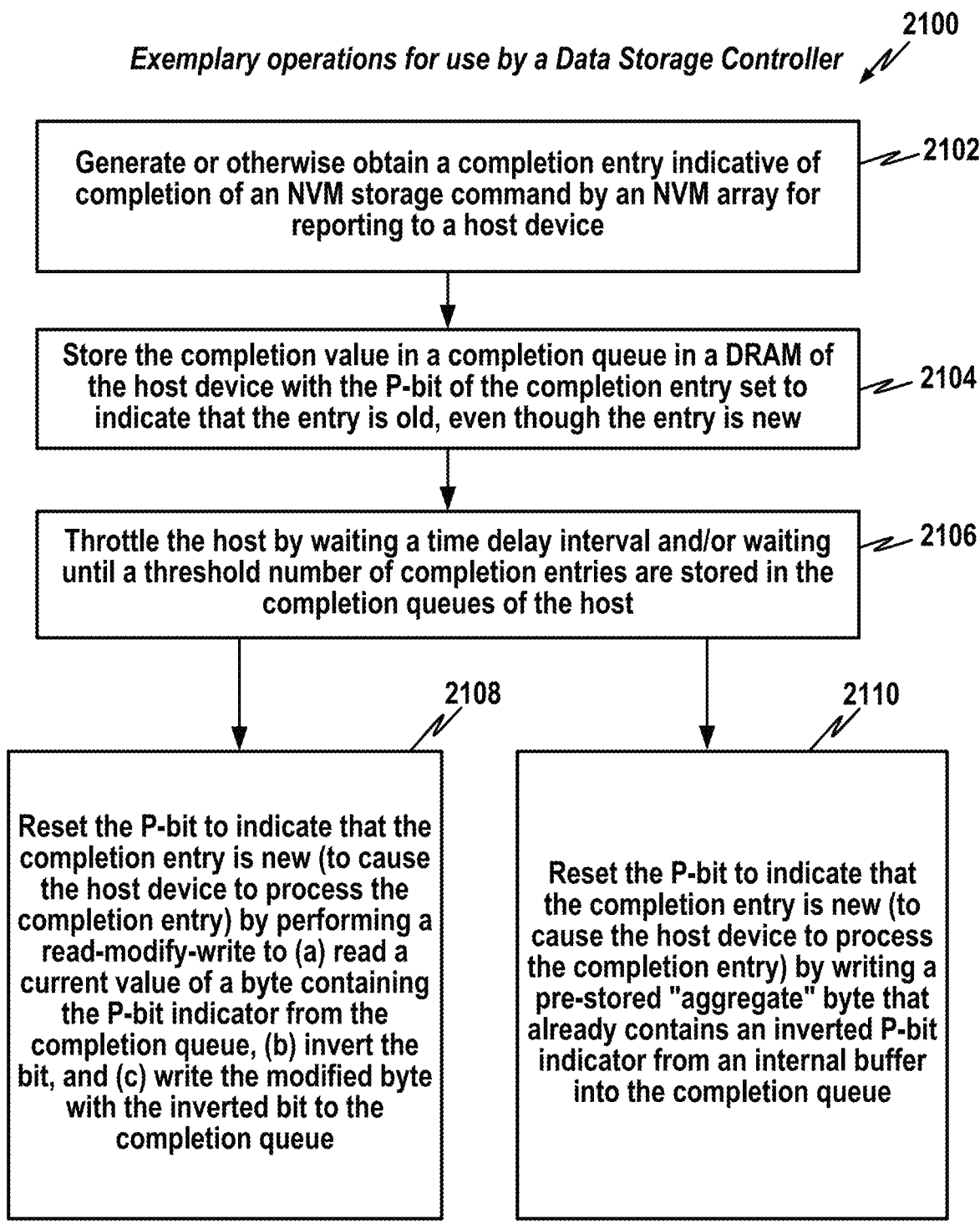
FIG. 21 is a flow chart summarizing further selected operations of a data storage controller equipped to throttle the delivery of completion entry values to a host device.

FIG. 21 summarizes operations 2100 that may be performed by a data storage controller or other suitably-equipped apparatus or device. Briefly, at block 2102, the data storage controller generates or otherwise obtains a completion entry indicative of completion of an NVM storage command by an NVM array for reporting to a host device. At block 2104, the data storage controller the completion value in a completion queue in a DRAM of the host device with the P-bit of the completion entry set to indicate that the entry is old, even though the entry is new. At block 1206, the data storage controller throttles the host by waiting a time delay interval and/or waiting until a threshold number of completion entries are stored in the completion queues of the host. Thereafter, depending on the configuration and programming of the data storage controller, one of at least two different procedures may be employed for resetting the P-bit in the completion entry. At block 2108, if so equipped, the data storage controller resets the P-bit to indicate that the completion entry is new (to cause the host device to process the completion entry) by performing a read-modify-write to (a) read a current value of a byte containing the P-bit indicator from the completion queue, (b) invert the bit, and (c) write the modified byte with the inverted bit to the completion queue. At block 2110, if so equipped, the data storage controller resets the P-bit to indicate that the completion entry is new (to cause the host device to process the completion entry) by writing a pre-stored "aggregate" byte that already contains an inverted P-bit indicator from an internal buffer into the completion queue. The procedures of blocks 2108 and 2110 are discussed above in connection with FIG. 15.

Additional Exemplary Devices and Apparatus

Figure 22:
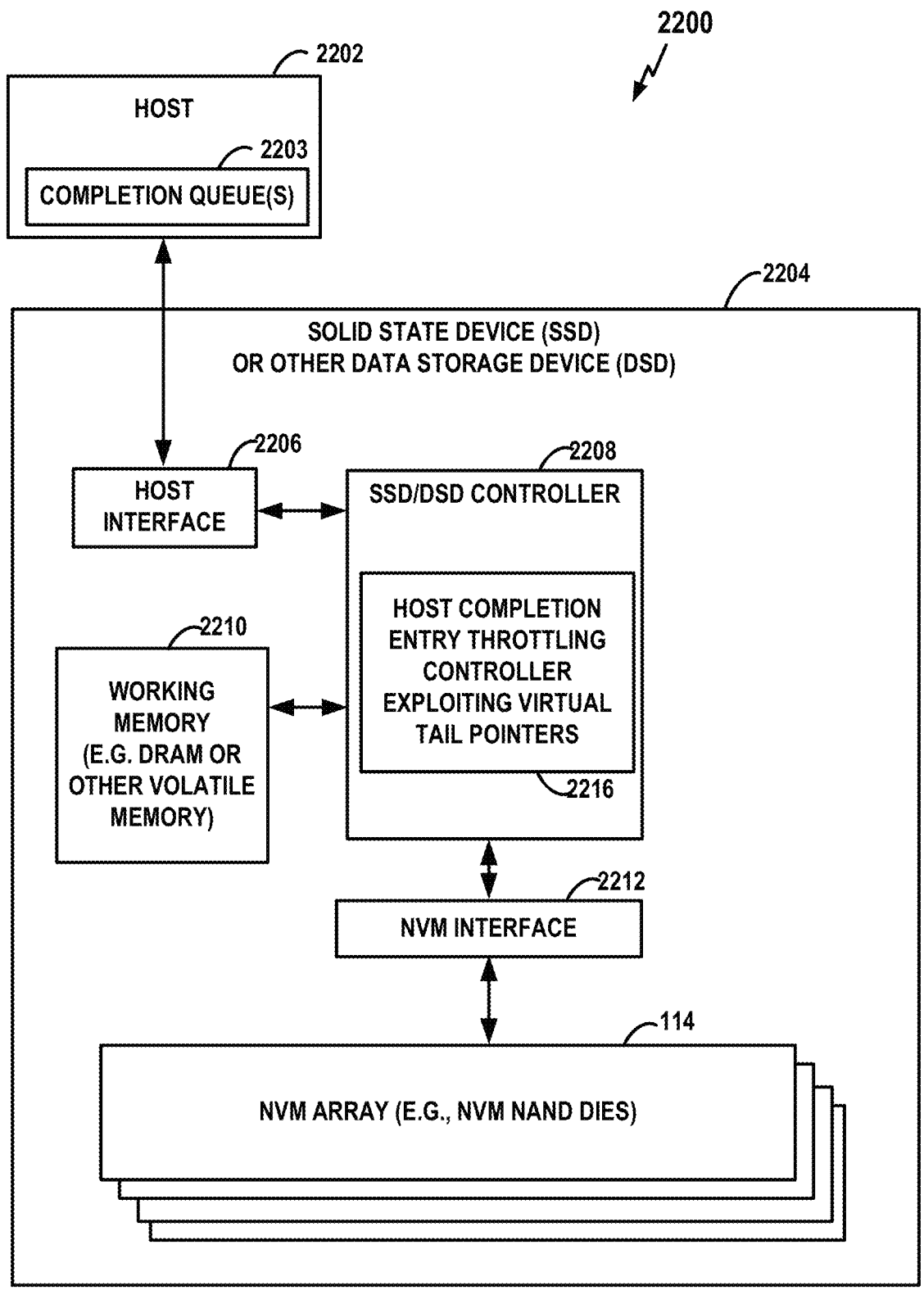
FIG. 22 is a schematic block diagram illustrating a data storage device in the form of an exemplary data storage device (DSD) having an NVM array and a processor configured for throttling the processing by a host of completion entries in a completion queue.

FIG. 22 is a block diagram of a system 2200 including an exemplary SSD configured for host completion entry throttling using virtual tail pointers in accordance with aspects of the disclosure. The system 2200 includes a host 2202, which includes one or more completion queues 2203. The system 2200 also includes an SSD 2204 (or other DSD, but for simplicity referred to as an SSD herein) coupled to the host 2202. The host 2202 provides commands to the SSD 2204 for transferring data between the host 2202 and the SSD 2204. For example, the host 2202 may provide a write command to the SSD 2204 for writing data to the SSD 2204 or read command to the SSD 2204 for reading data from the SSD 2204. The host 2202 may be any system or device having a need for data storage or retrieval and a compatible interface for communicating with the SSD 2204. For example, the host 2202 may a computing device, a personal computer, a portable computer, a workstation, a server, a personal digital assistant, a digital camera, or a digital phone as merely a few examples.

The SSD 2204 includes a host interface 2206, an SSD or DSD controller 2208, a working memory 2210 (such as DRAM or other volatile memory), an NVM interface 2212, and an NVM array 2214 having one or more dies for storing data. The host interface 2206 is coupled to the controller 2208 and facilitates communication between the host 2202 and the controller 2208. The controller 2208 is coupled to the volatile memory 2210 as well as to the NVM array 2214 via the NVM interface 2212. The host interface 2206 may be any suitable communication interface, such as a NVMe interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 22394 (Firewire) interface, or the like. In some embodiments, the host 2202 includes the SSD 2204. In other embodiments, the SSD 2204 is remote from the host 2202 or is contained in a remote computing system communicatively coupled with the host 2202. For example, the host 2202 may communicate with the SSD 2204 through a wireless communication link. The NVM array 2214 may include multiple dies.

Although, in the example illustrated in FIG. 22, SSD 2204 includes a single channel between controller 2208 and NVM array 2214 via interface 2212, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 2208 may be implemented in a single integrated circuit chip and may communicate with different layers of memory in the NVM 2214 over one or more command channels.

The controller 2208 controls operation of the SSD 2204. In various aspects, the controller 2208 receives commands from the host 2202 through the host interface 2206 and performs the commands to transfer data between the host 2202 and the NVM array 2214. Furthermore, the controller 2208 may manage reading from and writing to volatile memory 2210 for performing the various functions effected by the controller and to maintain and manage cached information stored in the volatile memory 2210.

The controller 2208 may include any type of processing device, such as a microprocessor, a microcontroller, an embedded controller, a logic circuit, software, firmware, or the like, for controlling operation of the SSD 2204. In some aspects, some or all of the functions described herein as being performed by the controller 2208 may instead be performed by another element of the SSD 2204. For example, the SSD 2204 may include a microprocessor, a microcontroller, an embedded controller, a logic circuit, software, firmware, application specific integrated circuit (ASIC), or any kind of processing device, for performing one or more of the functions described herein as being performed by the controller 2208. According to other aspects, one or more of the functions described herein as being performed by the controller 2208 are instead performed by the host 2202. In still further aspects, some or all of the functions described herein as being performed by the controller 2208 may instead be performed by another element such as a controller in a hybrid drive including both non-volatile memory elements and magnetic storage elements.

The working memory 2210 may be any suitable memory, computing device, or system capable of storing data. For example, working volatile memory 2210 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like. In various embodiments, the controller 2208 uses the working memory 2210, or a portion thereof, to store data during the transfer of data between the host 2202 and the NVM array 2214. For example, the working memory 2210 or a portion of the volatile memory 2210 may be a cache memory. The NVM array 2214 receives data from the controller 2208 via the NVM interface 2212 and stores the data. In some embodiments, working memory 2210 may be replaced by a non-volatile memory such as PCM arrays, MRAM arrays, and ReRAM arrays.

In the example of FIG. 22, the controller 2208 may include hardware, firmware, software, or any combinations thereof that provide a host completion entry throttling controller exploiting virtual tail pointers 2216. Although FIG. 22 shows an exemplary SSD and an SSD is generally used as an illustrative example in the description throughout, the various disclosed embodiments are not necessarily limited to an SSD application/implementation. As an example, the disclosed NVM array and associated processing components can be implemented as part of a package that includes other processing circuitry and/or components. For example, a processor may include, or otherwise be coupled with, embedded NVM array and associated circuitry. The processor could, as one example, off-load certain operations to the NVM and associated circuitry and/or components. As another example, the SSD controller 2208 may be a controller in another type of device and still be configured to perform or control the prediction of an estimated future host access rate of MPEG data and perform some or all of the other functions described herein.

Figure 23:
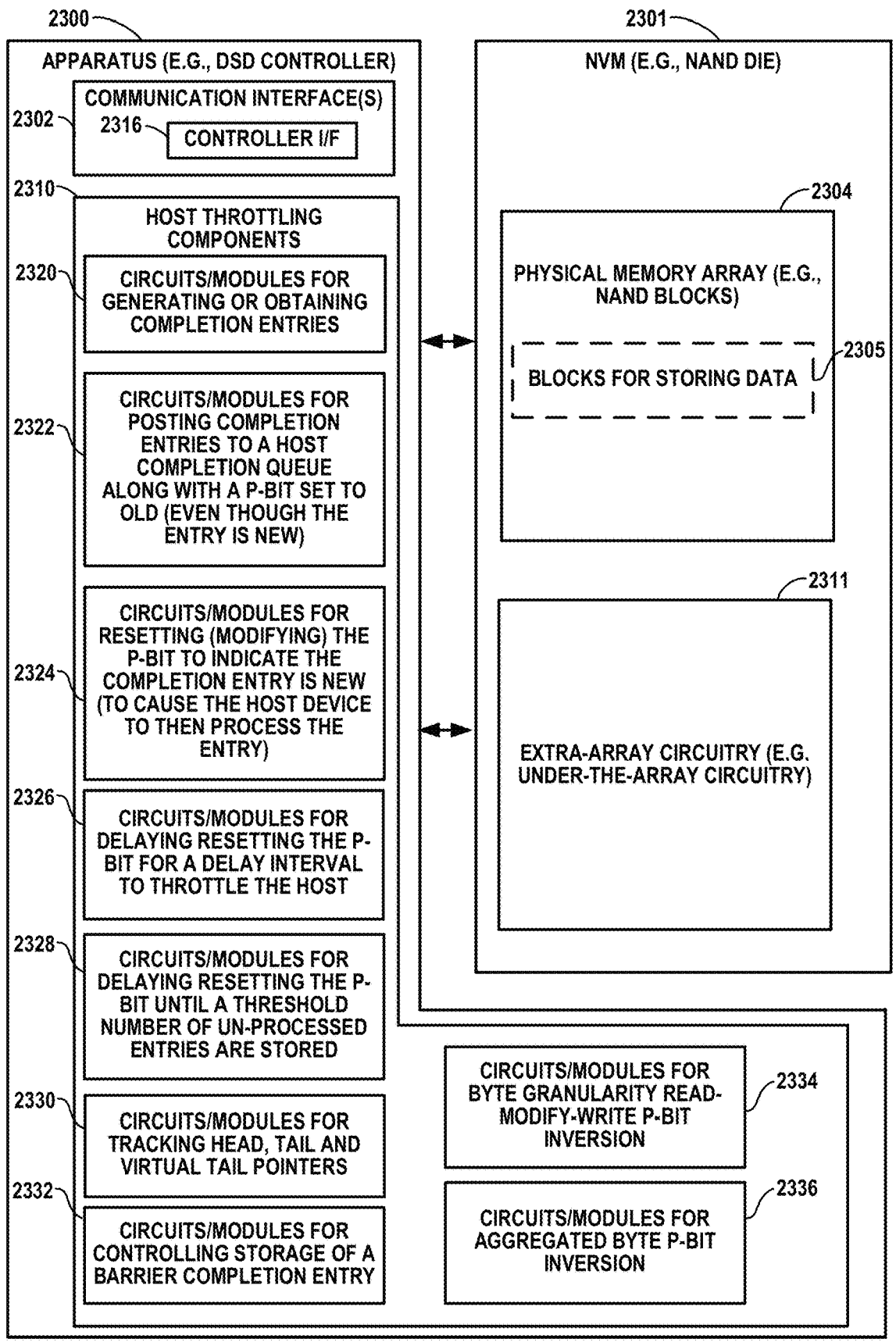
FIG. 23 is a schematic block diagram configuration for an exemplary apparatus and NVM device configured in accordance with some aspects of the disclosure.

FIG. 23 illustrates an embodiment of an apparatus 2300 configured according to one or more aspects of the disclosure. The apparatus 2300, or components thereof, could embody or be implemented within a data storage controller such as a DSD controller coupled to a NAND die or some other type of NVM array that supports data storage. In various implementations, the apparatus 2300, or components thereof, could be a component of a processor, a controller, a computing device, a personal computer, a portable device, or workstation, a server, a personal digital assistant, a digital camera, a digital phone, an entertainment device, a medical device, a self-driving vehicle control device, an edge device, or any other electronic device that stores, processes or uses data.

The apparatus 2300 includes a communication interface 2302 and is coupled to a NVM 2301 (e.g. a NAND die). The NVM 2301 includes physical memory array 2304 and extra-array processing circuits 2311 (e.g. under-the-array or next-to-the-array circuits). The physical memory array 2304 may include one or more blocks 2340 for storing data. These components can be coupled to and/or placed in electrical communication with one another via suitable components, represented generally by the connection line in FIG. 23. Although not shown, other circuits such as timing sources, peripherals, voltage regulators, and power management circuits may be provided, which will not be described any further.

The communication interface 2302 of the apparatus 2300 provides a means for communicating with other apparatuses over a transmission medium. In some implementations, the communication interface 2302 includes circuitry and/or programming (e.g., a program) adapted to facilitate the communication of information bi-directionally with respect to one or more devices in a system. In some implementations, the communication interface 2302 may be configured for wire-based communication. For example, the communication interface 2302 could be a bus interface, a send/receive interface, or some other type of signal interface including circuitry for outputting and/or obtaining signals (e.g., outputting signal from and/or receiving signals into a DSD).

The physical memory array 2304 may include one or more NAND blocks. The physical memory array 2304 may be coupled to the circuits 2311 such that the circuits 2311 and/or components of the apparatus 2300 and can read or sense information from, and write or program information to, the physical memory array 2304. That is, the physical memory array 2304 can be coupled to the circuits 2311 and/or components of the apparatus 2300 so that the physical memory array 2304 is accessible by the circuits 2311 and/or components of the apparatus 2300. For instance, the circuits 2311 may be on-chip ECC circuits.

The apparatus 2300 includes various host throttling processing components 2310 arranged or configured to obtain, process and/or send data, control data access and storage, issue or respond to commands, and control other desired operations. For example, the components 2310 may be implemented as one or more processors, one or more controllers, and/or other structures configured to perform functions. According to one or more aspects of the disclosure, the components 2310 may be adapted to perform any or all of the features, processes, functions, operations and/or routines described herein. For example, the components 2310 may be configured to perform any of the steps, functions, and/or processes described with respect to FIGS. 1-22. As used herein, the term "adapted" in relation to components 2310 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with FIGS. 1-22. The components 2310 serve as an example of a means for processing. In various implementations, the components 2310 may provide and/or incorporate, at least in part, functionality described above for the components 2216 of FIG. 21.

According to at least one example of the apparatus 2300, the host throttling components 2310 may include one or more of: circuit/modules 2320 configured for generating or obtaining completion entries; circuits/modules 2322 configured for posting completion entries to a host completion queue along with a P-bit set to old (even though the entry is new); circuits/modules 2324 configured for resetting (modifying) the P-bit indicator to indicate the completion entry is new (to cause the host device to then process the entry); circuits/modules 2326 configured for delaying the resetting of the P-bit for a delay interval to throttle the host; circuits/modules 2328 configured for delaying the resetting of the P-bit until a threshold number of un-processed entries are stored; circuits/modules 2330 configured for tracking head, tail and virtual tail pointers; circuits/modules 2332 configured for controlling storage of a barrier completion entry (e.g. of the type described above in connection with FIG. 16); circuits/modules 2334 configured for byte granularity read-modify-write P-bit inversion (e.g., as described above in connection with FIG. 21); and circuits/modules 2336 configured for aggregated byte P-bit inversion (e.g., as described above in connection with FIG. 21).

In at least some examples, means may be provided for performing the functions illustrated in FIG. 23 and/or other functions illustrated or described herein. For example, the means may include one or more of: means, such as circuit/module 2320, for generating or obtaining completion entries; means, such as circuits/modules 2322, configured for posting completion entries to a host completion queue along with a P-bit set to old (even though the entry is new); means, such as circuits/modules 2324, for resetting the P-bit indicator to indicate the completion entry is new (to cause the host device to then process the entry); means, such as circuits/modules 2326, for delaying the resetting of the P-bit for a delay interval to throttle the host; means, such as circuits/modules 2328, for delaying the resetting of the P-bit until a threshold number of un-processed entries are stored; circuits/modules 2330 configured for tracking head, tail and virtual tail pointers; means, such as circuits/modules 2332, for controlling storage of a barrier completion entry (e.g. of the type described above in connection with FIG. 16); means, such as circuits/modules 2334, for byte granularity read-modify-write P-bit inversion (e.g., as described above in connection with FIG. 21); and means, such as circuits/modules 2336, configured for aggregated byte P-bit inversion (e.g., as described above in connection with FIG. 21).

The subject matter described herein can be implemented in any suitable NAND flash memory, including 2D or 3D NAND flash memory. Semiconductor memory devices include volatile memory devices, such as DRAM) or static random access memory ("SRAM") devices, nonvolatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layers of the memory elements are formed or it may be a carrier substrate which is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Various details of the presently disclosed subject matter may be changed without departing from the scope of the presently disclosed subject matter. Furthermore, the foregoing description is for the purpose of illustration only, and not for the purpose of limitation.

What is claimed is:

1. A hardware data storage controller of a data storage device for use with a host device, the data storage controller comprising:
   a processing system configured to:
   receive a command from the host device;
   generate a value indicative of completion of the command by the data storage device for reporting to the host device within a queue of the host device, the host device configured to process values within the queue that have a corresponding indicator set to indicate that the value has not yet been processed and to ignore other values in the queue;
   store the value in the queue of the host device along with an indicator set to indicate to the host device that the host device has already processed the value, even though the host device has not yet processed the value, to thereby prevent the host device from processing the value until the indicator is reset by the data storage controller, and wherein the data storage controller contains an alternate version of the indicator;
   wait a time delay interval sufficient to throttle the host device; and
   reset the indicator in the queue of the host device following the time delay interval by writing the alternate version of the indicator into the queue of the host device to replace the indicator in the queue, without first reading the indicator from the queue of the host device, to indicate to the host device that the value has not yet been processed to thereby enable the host device to process the value.

2. The hardware data storage controller of claim 1, wherein the value is a completion entry and the queue is a completion queue configured to store a plurality of completion entries, each having a corresponding indicator and a corresponding alternate version of the indicator.

3. The hardware data storage controller of claim 2, wherein the time delay interval comprises a time elapsed until a threshold number of un-processed completion entries are stored in the queue before resetting the indicator.

4. The hardware data storage controller of claim 2, wherein the corresponding indicator of the completion entry is a phase tag and wherein the corresponding alternate version of the indicator is an alternate phase tag.

5. The hardware data storage controller of claim 4, wherein the processing system is further configured to reset the indicator with an inverted phase tag.

6. The hardware data storage controller of claim 2, wherein the completion queue is a circular queue and wherein the processing system is further configured to maintain a head pointer, a tail pointer, and a virtual tail pointer that identify selected completion entries within the queue.

7. The hardware data storage controller of claim 6, wherein the processing system is further configured to:
   (a) control the head pointer to identify an earliest entry within the queue that has not yet been processed by the host device and has a corresponding indicator set to indicate that the host device has not yet processed the value;
   (b) control the tail pointer to identify an earliest entry within the queue that has not yet been processed by the host device but has a corresponding indicator set to indicate that the host device has processed the value; and
   (c) control the virtual tail pointer to identify an earliest entry within the queue that has been processed by the host device and has a corresponding indicator set to indicate that the host device has processed the value.

8. The hardware data storage controller of claim 7, wherein the processing system is further configured to set the indicators for all intermediate entries in the queue between the tail pointer and the virtual tail pointer to indicate that the host device has not yet processed the entries, with the indicator of the entry corresponding to the tail pointer providing a barrier to prevent the host device from processing the intermediate entries until the indicator of the entry corresponding to the tail pointer is reset.

9. The hardware data storage controller of claim 1, wherein the processing system is further configured to reset at least one other indicator using a read-modify-write operation to read a current value of the at least one other indicator from the queue, modify the current value, and write the modified value to the queue.

10. The hardware data storage controller of claim 9, wherein the processing system is further configured to perform the read-modify-write operation using a byte-granularity read-modify-write.

11. The hardware data storage controller of claim 1, wherein the data storage device is a non-volatile memory (NVM) device, and wherein the processing system is further configured to generate the value indicative of the completion of the command based on information obtained from the NVM device.

12. The hardware data storage controller of claim 1, wherein the indicator is an indicator byte.

13. A method for use by a data storage controller, comprising:
   receiving a command from a host device;
   generating a value indicative of completion of the command by the data storage controller for reporting to the host device within a queue of the host device, the host device configured to process values within the queue that have a corresponding indicator set to indicate that the value has not yet been processed and to ignore other values in the queue;
   storing the value in the queue of the host device along with an indicator set to indicate to the host device that the host device has already processed the value, even though the host device has not yet processed the value, to thereby prevent the host device from processing the value until the indicator is reset by the data storage controller, and wherein the data storage controller contains an alternate version of the indicator;

waiting a time delay interval sufficient to throttle the host device; and resetting the indicator in the queue of the host device following the time delay interval to indicate to the host device that the value has not yet been processed to thereby enable the host device to process the value, wherein resetting the indicator comprises writing the alternate version of the indicator into the queue of the host device to replace the indicator in the queue without first reading the indicator from the queue of the host device.

14. The method of claim 13, wherein storing the value in the queue comprises storing a completion entry in a completion entry queue along with a corresponding indicator.

15. The method of claim 14, wherein the time delay interval comprises a time elapsed until a threshold number of un-processed completion entries are stored in the queue before resetting the indicator.

16. The method of claim 14, wherein the corresponding indicator of the completion entry is a phase tag and wherein the corresponding alternate version of the indicator is an alternate phase tag.

17. The method of claim 16, wherein the corresponding alternate version of the indicator is an inverted phase tag.

18. The method of claim 14, wherein the completion queue is a circular queue and further comprising maintaining a head pointer, a tail pointer, and a virtual tail pointer that identify selected completion entries within the queue.

19. The method of claim 18, wherein maintaining the head pointer, the tail pointer, and the virtual tail pointer comprises:

(a) controlling the head pointer to identify an earliest entry within the queue that has not yet been processed by the host device and has a corresponding indicator set to indicate that the host device has not yet processed the value;

(b) controlling the tail pointer to identify an earliest entry within the queue that has not yet been processed by the host device but has a corresponding indicator set to indicate that the host device has processed the value; and (c) controlling the virtual tail pointer to identify an earliest entry within the queue that has been processed by the host device and has a corresponding indicator set to indicate that the host device has processed the value.

20. The method of claim 19, wherein storing the value in the queue of the host device along with the indicator further comprises setting the indicators for a set of intermediate entries in the queue between the tail pointer and the virtual tail pointer to indicate that the host device has not yet processed the entries, with the indicator of the entry corresponding to the tail pointer providing a barrier to prevent the host device from processing the intermediate entries until the indicator of the entry corresponding to the tail pointer is reset.

21. The method of claim 13, further comprising resetting at least one other indicator by performing a read-modify-write operation to read a current value of the at least one other indicator from the queue, modify the current value, and write the modified value to the queue.

22. The method of claim 21, wherein performing the read-modify-write operation comprises performing a byte-granularity read-modify-write.

23. The method of claim 13, wherein the data storage controller is a non-volatile memory (NVM) device, and wherein the value indicative of completion of the command is generated based on information obtained from the NVM device.

24. The method of claim 13, wherein the indicator is an indicator byte.

25. An apparatus for use with a hardware data storage controller, comprising:

means for receiving a command from a host device;

means for generating a value indicative of completion of the command by the data storage controller for reporting to a host device within a queue of the host device, the host device configured to process values within the queue that have a corresponding indicator set to indicate that the value has not yet been processed and to ignore other values in the queue;

means for storing the value in the queue of the host device along with an indicator set to indicate to the host device that the host device has already processed the value, even though the host device has not yet processed the value, to thereby prevent the host device from processing the value until the indicator is subsequently reset by the data storage controller, and wherein the data storage controller contains an alternate version of the indicator;

means for waiting a time delay interval sufficient to throttle the host device; and means for resetting the indicator in the queue of the host device following the time delay interval to indicate to the host device that the value has not yet been processed to thereby enable the host device to process the value, wherein the means for resetting the indicator comprises means for writing the alternate version of the indicator into the queue of the host device to replace the indicator in the queue without first reading the indicator from the queue of the host device.

* * * * *